US00RE38896E

(19) United States
(12) Reissued Patent
Anderson

(10) Patent Number: US RE38,896 E
(45) Date of Reissued Patent: Nov. 29, 2005

(54) APPARATUS AND METHOD FOR ROTATING THE DISPLAY ORIENTATION OF A CAPTURED IMAGE

(75) Inventor: Eric C. Anderson, San Jose, CA (US)

(73) Assignee: Apple Computer, Inc., Cupertino, CA (US)

(21) Appl. No.: 10/040,249

(22) Filed: Jan. 4, 2002

Related U.S. Patent Documents

Reissue of:
(64) Patent No.: 6,011,585
Issued: Jan. 4, 2000
Appl. No.: 08/588,210
Filed: Jan. 19, 1996

(51) Int. Cl.[7] ..... H04N 5/335
(52) U.S. Cl. ..... 348/272; 345/656; 348/222.1; 348/208.3; 382/296
(58) Field of Search ..... 382/296, 297; 348/208.99, 208.1, 208.2, 208.3, 208.4, 208.6, 208.12, 246, 272, 222.1; 345/656

(56) References Cited

U.S. PATENT DOCUMENTS

| | | | | | |
|---|---|---|---|---|---|
| 3,814,227 | A | * | 6/1974 | Hurd, III et al. | 197/1 R |
| 3,971,065 | A | * | 7/1976 | Bayer | 358/41 |
| 4,337,479 | A | | 6/1982 | Tomimoto | 358/37 |
| 4,364,650 | A | * | 12/1982 | Terashita et al. | 354/41 |
| 4,470,067 | A | | 9/1984 | Mino | 348/679 |
| 4,952,920 | A | | 8/1990 | Hayashi | |
| 4,995,089 | A | | 2/1991 | Altrieth, III | |
| 5,107,293 | A | * | 4/1992 | Sekine et al. | 348/208.99 |
| 5,218,459 | A | * | 6/1993 | Parulski et al. | 358/451 |
| 5,227,889 | A | * | 7/1993 | Yoneyama et al. | 348/208.2 |
| 5,262,863 | A | | 11/1993 | Okada | 348/679 |
| 5,270,831 | A | | 12/1993 | Parulski et al. | 358/403 |
| 5,276,519 | A | * | 1/1994 | Richards et al. | 382/293 |
| 5,448,372 | A | | 9/1995 | Axman et al. | 358/342 |
| 5,521,639 | A | * | 5/1996 | Tomura et al. | 348/243 |
| 5,533,185 | A | | 7/1996 | Lentz et al. | |
| 5,576,759 | A | | 11/1996 | Kawamura et al. | 348/231 |
| 5,598,181 | A | | 1/1997 | Kermish | |
| 5,634,088 | A | | 5/1997 | Banton | |
| 5,640,627 | A | | 6/1997 | Nakano et al. | 396/296 |
| 5,734,875 | A | | 3/1998 | Cheng | |
| 5,764,291 | A | | 6/1998 | Fullam | 348/362 |
| 5,805,216 | A | * | 9/1998 | Tabei et al. | 348/246 |
| 5,821,997 | A | | 10/1998 | Kawamura et al. | 348/131 |
| 5,854,641 | A | | 12/1998 | Howard et al. | |
| 5,900,909 | A | * | 5/1999 | Parulski et al. | 348/239 |
| 5,966,116 | A | | 10/1999 | Wakeland | |

FOREIGN PATENT DOCUMENTS

| | | | | |
|---|---|---|---|---|
| JP | 58-222382 | | 12/1983 | |
| JP | 4-120889 | * | 4/1992 | H04N/7/14 |

* cited by examiner

*Primary Examiner*—Wendy R. Garber
*Assistant Examiner*—Jason Whipkey
(74) *Attorney, Agent, or Firm*—Fenwick & West LLP

(57) ABSTRACT

The apparatus of the present invention preferably comprises an image sensor, an orientation sensor, a memory and a processing unit. The image sensor is used for generating captured image data. The orientation sensor is coupled to the image sensor, and is used for generating signals relating to the position of the image sensor. The memory, has an auto-rotate unit comprising program instructions for transforming the captured image data into rotated image data in response to the orientation sensor signals. The processing unit, executes program instructions stored in the memory, and is coupled to the image sensor, the orientation sensor and the memory. The method of the present invention preferably comprises the steps of: generating image data representative of an object with an image sensor; identifying an orientation of the image sensor relative to the object during the generating step; and selectively transferring the image data to an image processing unit in response to the identifying step.

44 Claims, 17 Drawing Sheets

TOP of an Upright Landscape Image

<<<<< Columns >>>>>

TOP of First Portrait Image

<<<<<<<<< Rows >>>>>>>>>

TOP of Second Portrait Image

| | $c_1$ | $c_2$ | $c_3$ | $c_4$ | $c_5$ | $c_6$ | ... | $c_{635}$ | $c_{636}$ | $c_{637}$ | $c_{638}$ | $c_{639}$ | $c_{640}$ |
|---|---|---|---|---|---|---|---|---|---|---|---|---|---|
| $r_1$ | G | R | G | R | G | R | ... | R | G | R | G | R | G |
| $r_2$ | B | G | B | G | B | G | ... | G | B | G | B | G | B |
| $r_3$ | G | R | G | R | G | R | ... | R | G | R | G | R | G |
| $r_4$ | B | G | B | G | B | G | ... | G | B | G | B | G | B |
| | . | . | . | . | . | . | . | . | . | . | . | . | . |
| | . | . | . | . | . | . | . | . | . | . | . | . | . |
| $r_{477}$ | B | G | B | G | B | G | ... | G | B | G | B | G | B |
| $r_{478}$ | G | R | G | R | G | R | ... | R | G | R | G | R | G |
| $r_{479}$ | B | G | B | G | B | G | ... | G | B | G | B | G | B |
| $r_{480}$ | G | R | G | R | G | R | ... | R | G | R | G | R | G |

Fig. 1C (Prior Art)

APPARATUS AND METHOD FOR ROTATING THE DISPLAY ORIENTATION OF A CAPTURED IMAGE

Matter enclosed in heavy brackets [ ] appears in the original patent but forms no part of this reissue specification; matter printed in italics indicates the additions made by reissue.

This application relates to co-pending U.S. patent application Ser. No. 08/355,031, entitled A System and Method For Generating a Contrast Overlay as a Focus Assist for An Imaging Device, filed on Dec. 13, 1994, by inventor Eric C. Anderson; and U.S. patent application Ser. No. 08/384,012, entitled Apparatus and Method for Camera Image and Orientation Capture, filed on Feb. 6, 1995, by inventor Scott Fullam. The subject matter of the two applications described above is hereby incorporated by reference. These related applications are commonly assigned to Apple Computer, Inc.

BACKGROUND OF THE INVENTION

1. Field of the Invention

The present invention relates generally to an apparatus and method for orienting an image. More particularly, the present invention is an apparatus and method for rotating a captured image to an orientation corresponding to an imaging subsystem's orientation at the time in which the image was captured.

2. Description of the Background Art

When a digital camera captures an image of an object, the camera's frame of reference with respect to the object produces a desired image orientation. Two conventional image orientations exist, namely, a landscape orientation and a portrait orientation. Referring now to FIG. 1A, a prior art graphical representation of an object in a landscape orientation is shown, in which the image's width is greater than its height. Referring also now to FIG. 1B, a prior art graphical representation of the object in a portrait orientation is shown, in which the image's height is greater than its width.

In a digital camera, an image sensor is comprised of light-sensitive devices, such as charge-coupled devices (CCD), that convert an optical image into a set of electrical signals. Referring now to FIG. 1C, a prior art image sensor is shown having a 480 row by 640 column matrix of light collecting pixels. The image sensor is orientated within a body of the digital camera so that a first row of pixels (i.e. row $r_1$) corresponds to the bottom of an upright and level digital camera. This image sensor orientation is required since as an optical image passes through a conventional camera lens it is inverted. The image sensor in a color digital camera typically consists of an array of green (G), red (R) and blue (B) pixels. Alternative embodiments include sensors detecting cyan, magenta, yellow and green as is typically used in video cameras. Other image sensor configurations are also used. The pixels that comprise the image sensor are arranged into various patterns or formats. A common image sensor format is called a Bayer pattern. The Bayer pattern format is defined as a pixel pattern comprised of 50% green-light responsive pixels, 25% red-light responsive pixels and 25% blue-light responsive pixels arranged in alternating rows of "GRGRGR" and "BGBGBG," as shown in FIG. 1C. Throughout this specification, "G" means "green," "R" means "red," and "B" means "blue."

Once an image is captured by the digital camera, a set of pixel signals corresponding to the image received by the pixels is processed by an image processing algorithm. Image processing routines are conventionally designed to process pixel signals line-by-line, conforming to a specific and unchanging pixel pattern format. Thus, image sensors manufactured with the Bayer pixel pattern format will be coupled to image processing routines specifically designed to accept pixel signals in alternating sequences of "GRGRGR" and "BGBGBG." Due to possible imperfections in the outer rows and columns of pixels that make up the image sensor, conventional digital cameras sometimes have image sensors large enough so that one or more lines of pixels at the sides of the image sensor can be ignored.

Referring now to FIG. 1D, a prior art graphical representation is shown of the object as captured in the portrait orientation and output upon an image display 100. The image display 100 is typically a conventional stand-alone, personal computer CRT having a top 102, a right side 104, a left side 106 and a bottom 108.

As previously described, the image processing routines within digital cameras are conventionally designed to process pixel signals on a line-by-line basis according to only one pixel pattern format. Thus, conventional digital cameras process images as if they were always in a landscape format. In the presentation of the landscape image of FIG. 1A upon the image display, the "TOP" (i.e. "top portion") of the landscape image would correspond to the top 102 of the FIG. 1D image display 100. Such an orientation for landscape images on the image display 100 is quite natural and is acceptable for ease of viewing the image. However, the presentation of the portrait image of FIG. 1B upon the image display results in the "TOP" of the portrait image corresponding to either the right side 104 or the left side 106 of the image display 100, depending on how the user had rotated the digital camera. FIG. 1D explicitly shows the case where the "TOP" of the portrait image corresponds to the right side 104 of the image display 100. This "sideways" orientation for portrait images on the image display 100 is unacceptable and unnatural. This undesirable by-product of conventional digital cameras requires that the user rotate portrait images so that they are presented in a more natural and upright viewing angle on the image display 100. It should be noted that this problem also exists for digitized images from conventional film cameras. Traditional rotation methods also have the disadvantage of requiring two blocks of memory to rotate a stored image.

What is needed is an apparatus and method that efficiently and automatically rotates a stored photographic image to correspond to the orientation in which the photographic image was captured.

SUMMARY OF THE INVENTION

The present invention is an apparatus and method for rotating the display orientation of a captured image. The apparatus of the present invention preferably comprises an image sensor, an orientation sensor, a memory and a processing unit. The image sensor is used for capturing image data. The orientation sensor is coupled to the image sensor, and is used for generating a portrait signal if the image sensor is positioned in a portrait orientation relative to the object. The memory, has an auto-rotate unit comprising program instructions for transforming the captured image data into rotated image data in response to the portrait signal. The processing unit, is used for executing program instructions stored in the memory, and is coupled to the image sensor, the orientation sensor and the memory.

The method of the present invention preferably comprises the steps of: generating image data representative of an object with an image sensor; identifying an orientation of the image sensor relative to the object during the generating step; and selectively transferring the image data to an image processing unit in response to the identifying step.

BRIEF DESCRIPTION OF THE DRAWINGS

FIG. 1C, is a prior art 480 row by 640 column image sensor;

DETAILED DESCRIPTION OF THE PREFERRED EMBODIMENTS

The present invention is an apparatus and method for rotating the display orientation of a captured image.

Figure 2:
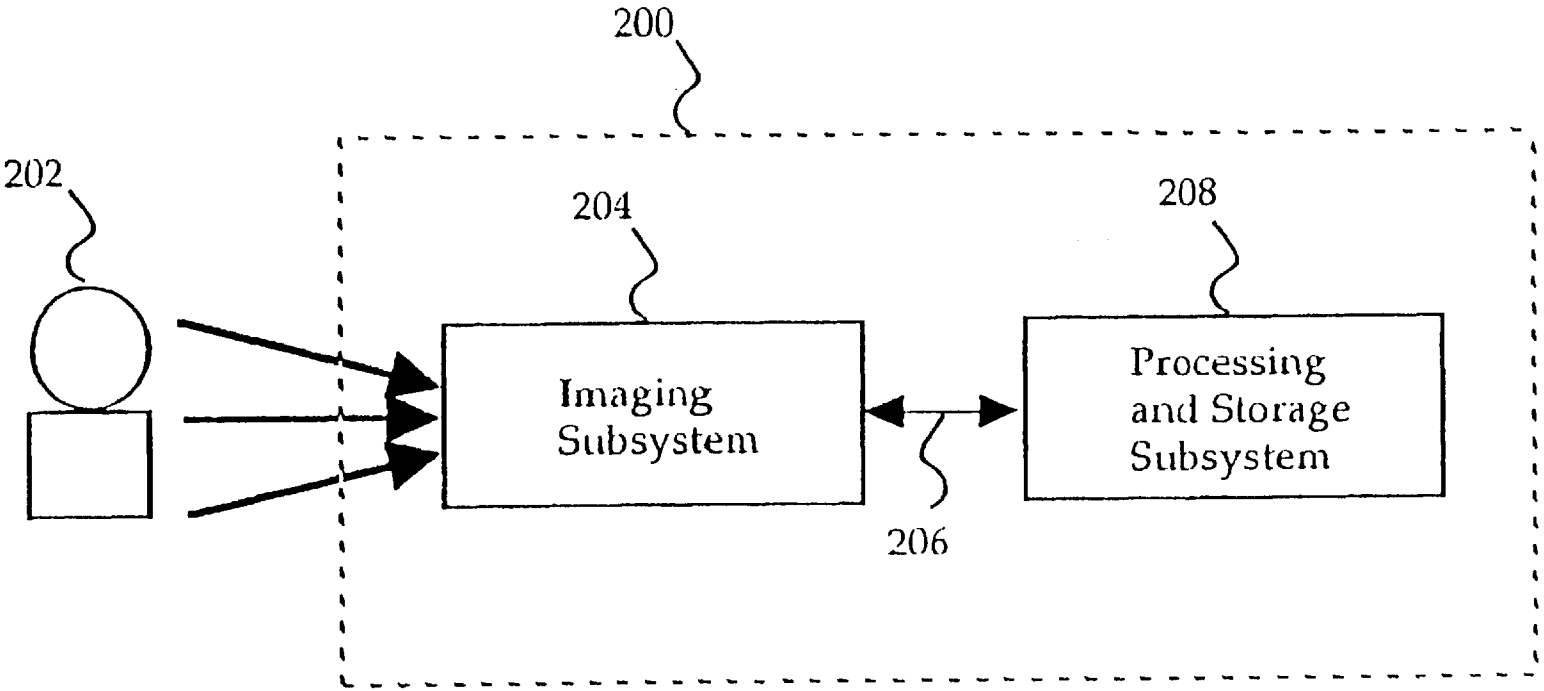
FIG. 2, is a block diagram of a preferred embodiment of an apparatus for rotating the display orientation of a captured image.

Referring now to FIG. 2, a block diagram is shown illustrating a camera 200 for rotating a display orientation of a captured image. In the preferred embodiment, the camera 200 is a digital camera, such as a QuickTake 150, by Apple Computer of Cupertino, Calif. The camera 200 preferably comprises an imaging subsystem 204, a bus 206 and a processing and storage subsystem 208. Reflected light from an object 202 is conventionally captured by the imaging subsystem 204 via a button press or some other action. The captured image data is transferred over the bus 206 to the processing and storage subsystem 208, which stores the data in internal memory. The bus 206 also passes various status and control signals between the imaging subsystem 204 and the processing and storage subsystem 208, as will be further discussed below.

Figure 3A:
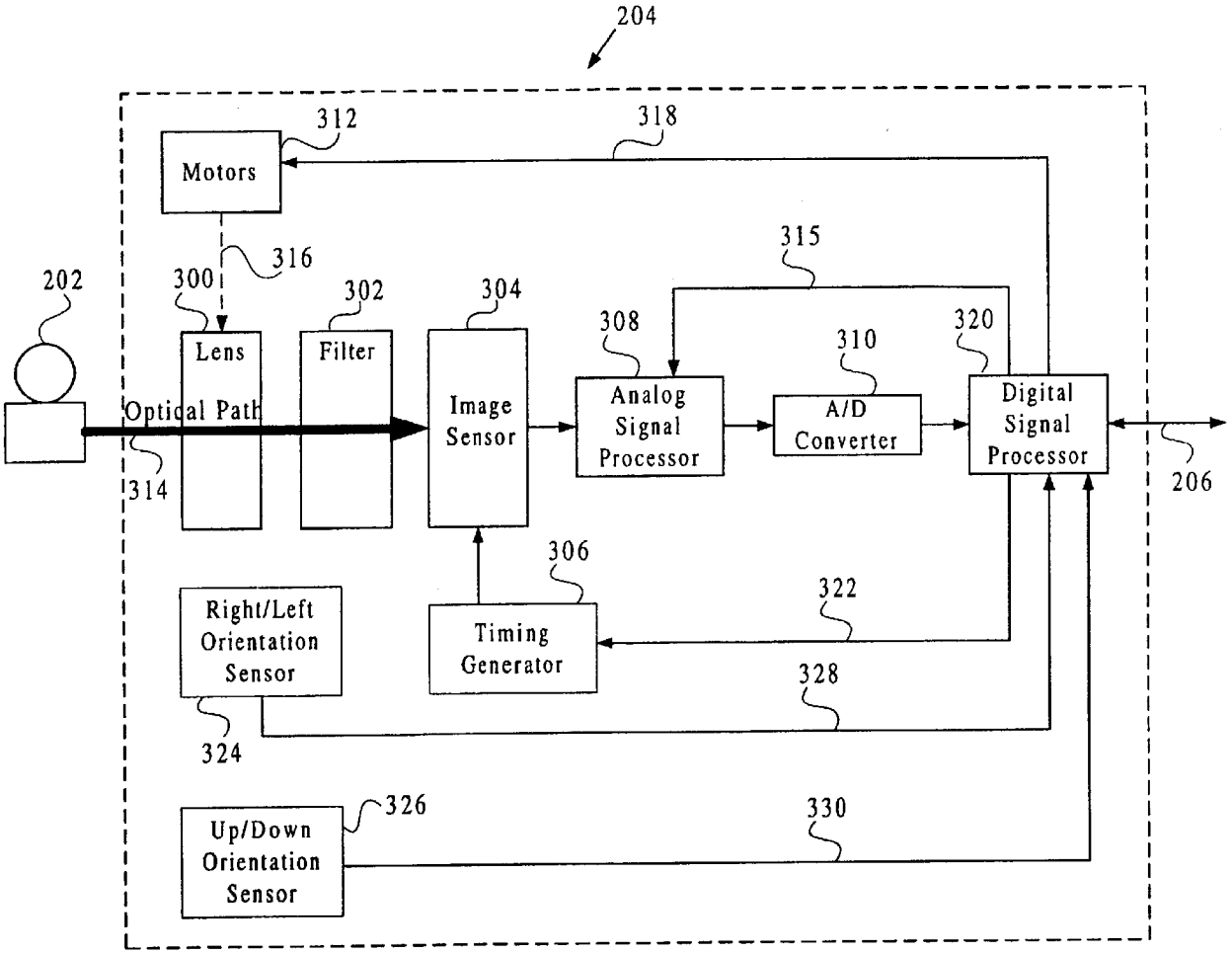
FIG. 3A, is a block diagram of a preferred embodiment of an imaging subsystem of the present invention.

Referring now to FIG. 3A, a block diagram is shown illustrating the imaging subsystem 204 of the present invention. The imaging subsystem 204 preferably comprises a lens 300 having an iris, an optical filter 302, an image sensor 304, a timing generator 306, an analog signal processor (ASP) 308, an analog-to-digital (A/D) converter 310, a digital signal processor (DSP) 320, a right/left orientation sensor (RLOS) 324, an up/down orientation sensor (UDOS) 326 and one or more motors 312. U.S. patent application Ser. No. 08/355,031, entitled A System and Method For Generating a Contrast Overlay as a Focus Assist For An Imaging Device, filed on Dec. 13, 1994 is incorporated herein by reference and provides a detailed discussion of the preferred elements in the imaging subsystem 204, with the exception of the RLOS 324 and the UDOS 326. U.S. patent application Ser. No. 08/384,012, entitled Apparatus and Method for Camera image and Orientation Capture, filed on Feb. 6, 1995 is incorporated herein by reference and provides a detailed discussion of various embodiments of the RLOS 324 and the UDOS 326, which are further discussed below. Briefly, the imaging subsystem 204 captures an image of the object 202 via light impacting the image sensor 304 along an optical path 314. The image sensor 304 in turn generates a set of pixel signals representative of the captured image data. After being processed by the ASP 308, the A/D converter 310 and the DSP 320; the captured image data passes over the bus 206 to the processing and storage subsystem 208. The functions performed by the DSP 320 may alternatively be performed in the processing and storage subsystem 208.

Figure 3B:
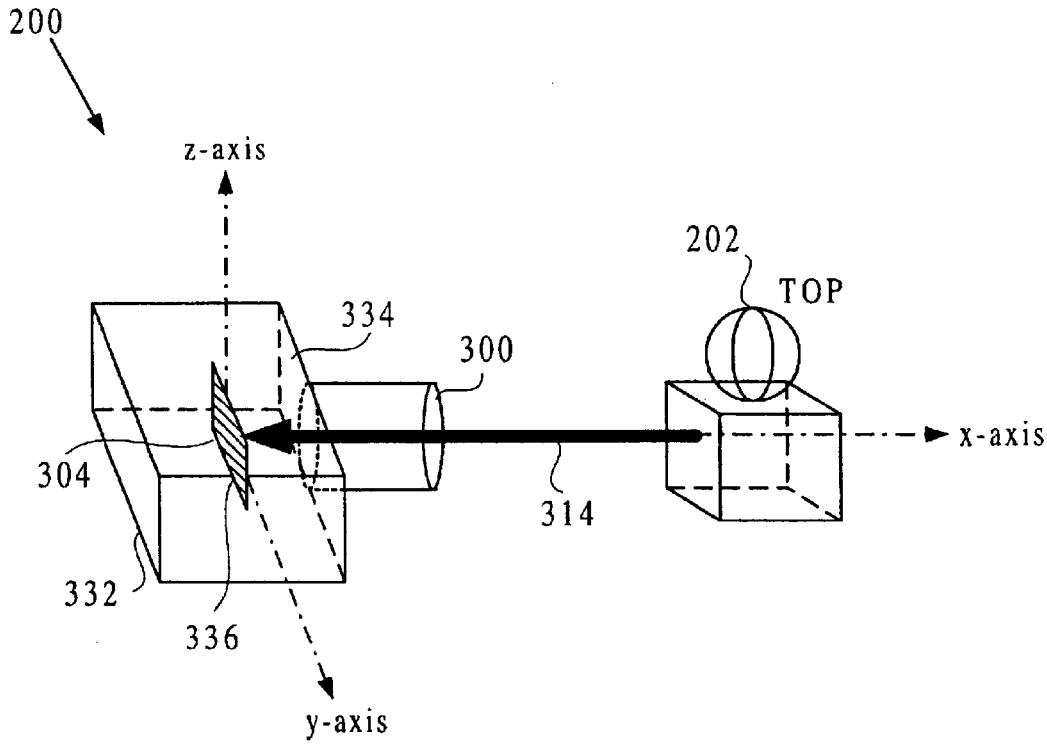
FIG. 3B, is a first graphical representation of a preferred embodiment of an image sensor disposed within the present invention.

Referring now to FIG. 3B, a graphical representation is shown illustrating the image sensor 304 disposed within the camera 200. FIG. 3B shows the camera 200 maintained in a landscape orientation while directly facing the object 202. The image sensor 304 has a front 338 and a top 336, which are juxtaposed with a front 334 and a bottom 332 of the camera 200 respectively. The front side 338 of the image sensor 304 comprises light-sensitive pixels, which capture an image received along the optical path 314 and through the lens 300 mounted upon the camera 200. It should be noted that the image recorded by the image sensor 304 is inverted relative to the object by the lens 300. The front 338 of the image sensor 304 preferably forms a planar surface as shown in perspective in FIG. 3B. When the image sensor 304 is oriented as shown in FIG. 3B, a landscape image of the object 202 is captured. When the camera 200 is rotated either 90° clockwise or 90° counterclockwise about the x-axis, a portrait image of the object 202 is captured.

Figure 3C:
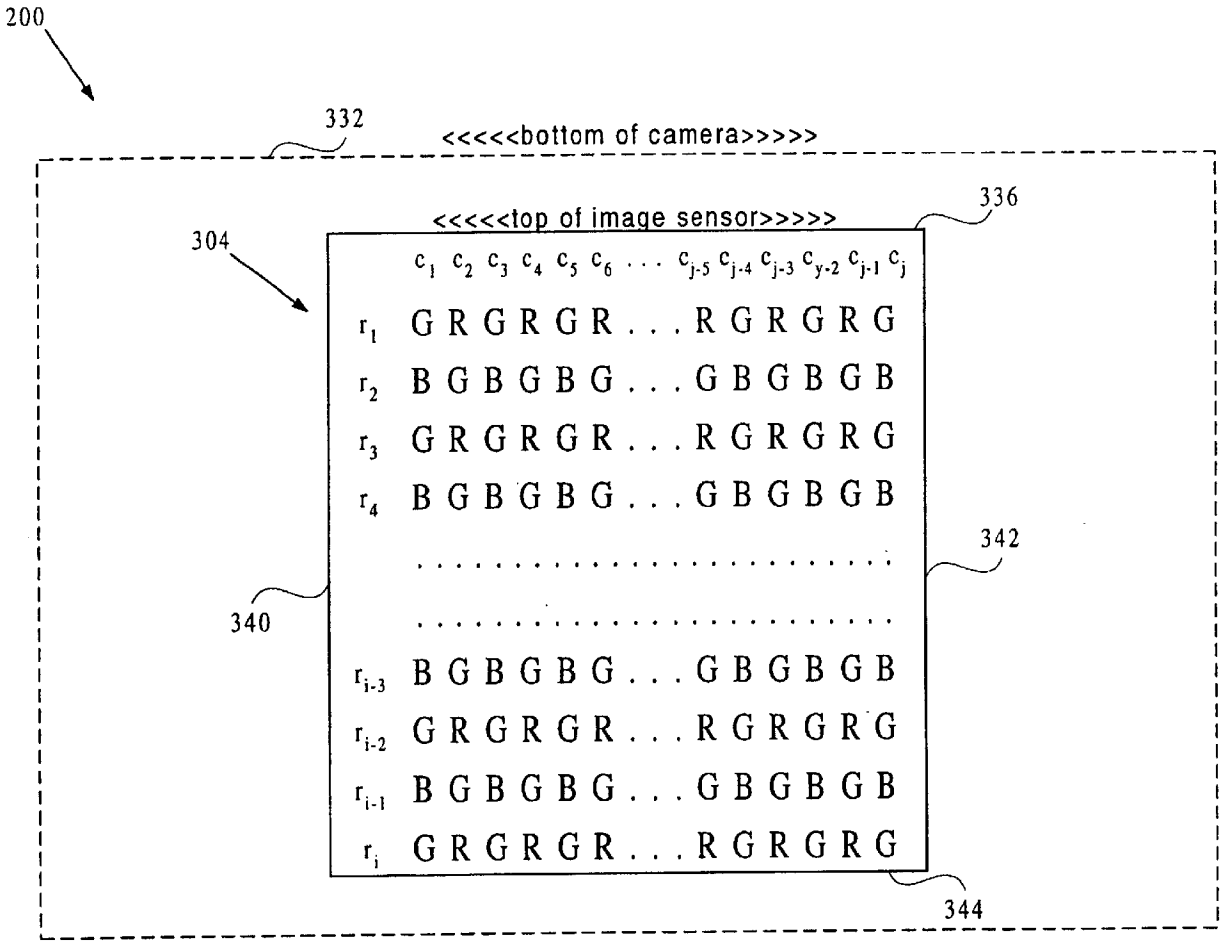
FIG. 3C, is a second graphical representation of a preferred embodiment of the image sensor within the present invention.

Referring now to FIG. 3C, a graphical representation is shown illustrating the image sensor 304, which has the top 336, a right side 342, a left side 340 and a bottom 344. The image sensor 304 is comprised of a plurality of pixels arranged in an i-row by j-column array. In the preferred embodiment, the pixels are arranged in a Bayer pattern format. Alternatively the present invention may be applied to image sensors of various sizes and image processing routines designed to process pixel signals arranged in patterns or formats different from the Bayer pattern.

Figure 1A:
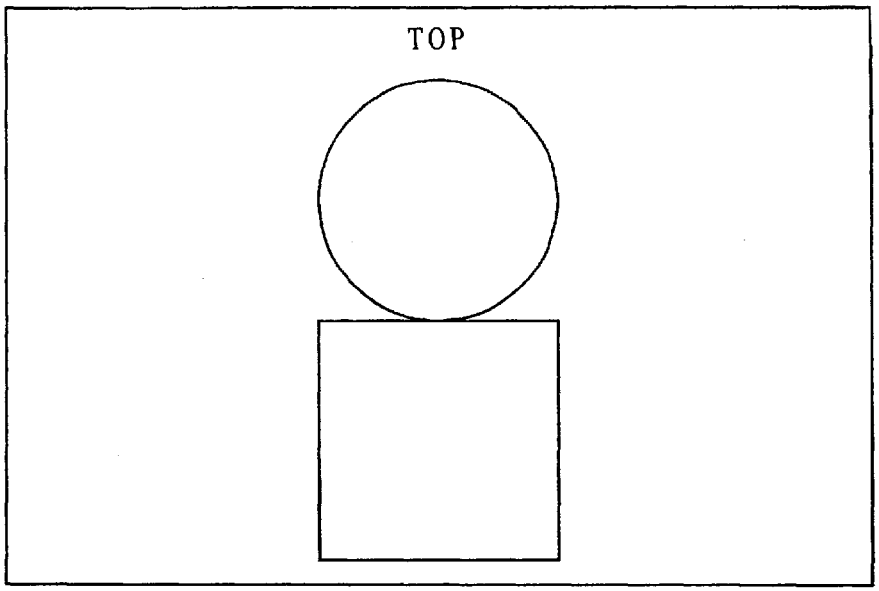
Fig. 1A (Prior Art)
FIG. 1A, is a prior art graphical representation of an object in a landscape orientation.
Figure 1B:
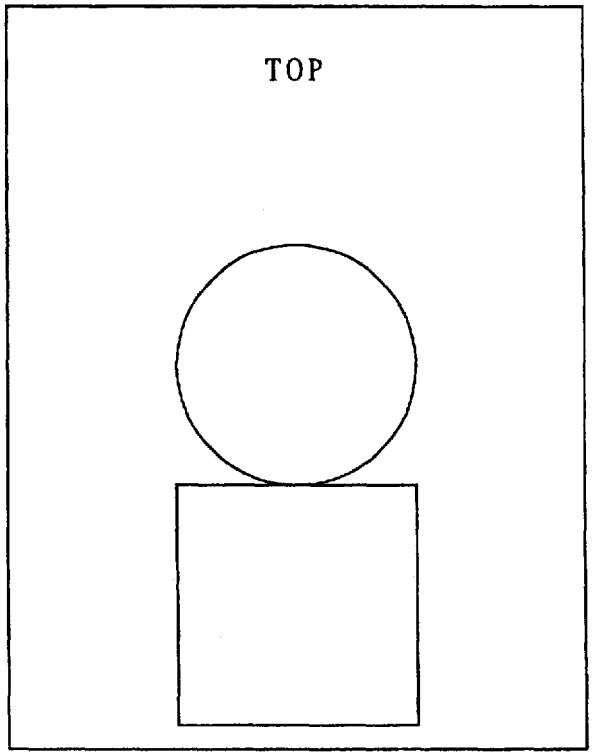
Fig. 1B (Prior Art)
FIG. 1B, is a prior art graphical representation of the object in a portrait orientation.
Figure 1D:
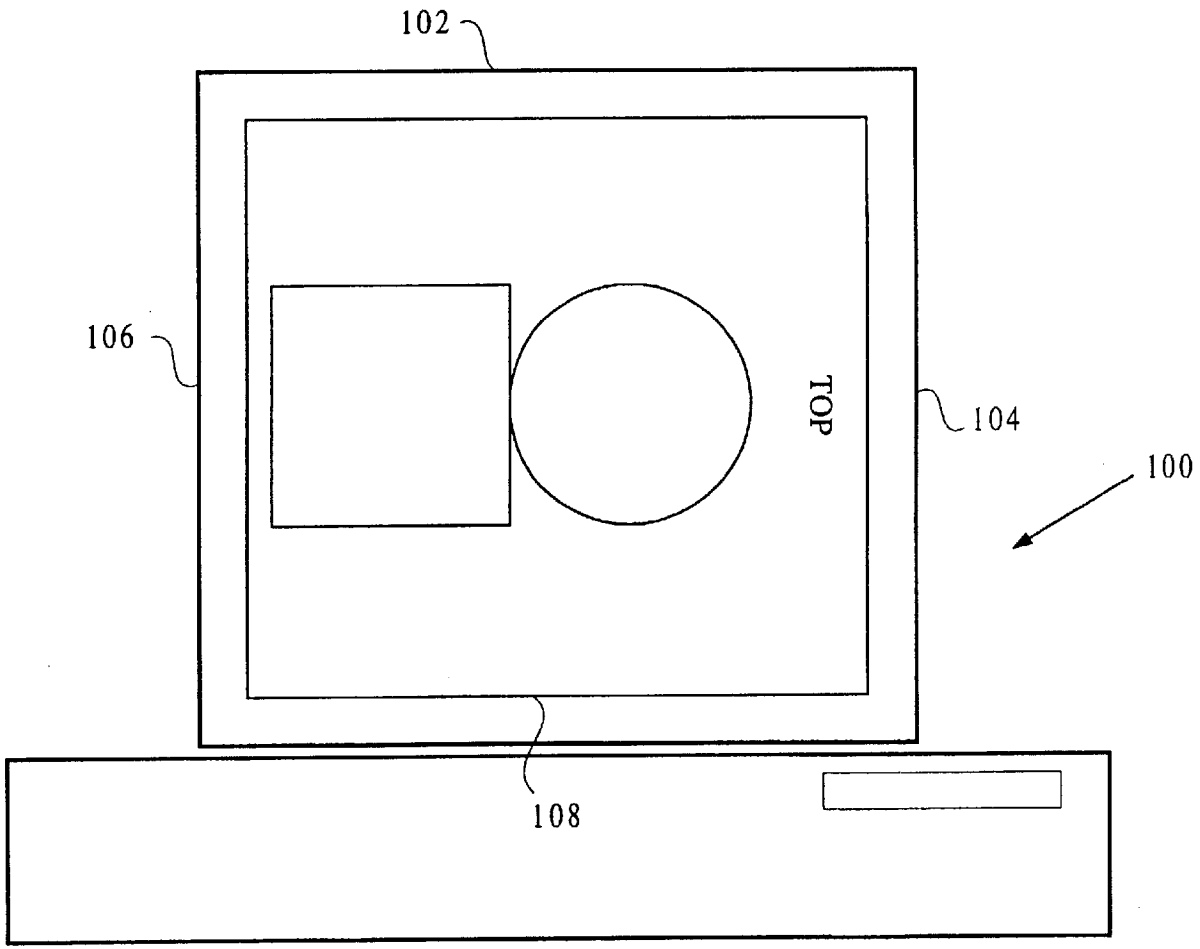
Fig. 1D (Prior Art)
FIG. 1D, is a prior art graphical representation of the object as captured in the portrait orientation and output upon an image display.

As stated above, the RLOS 324 (i.e. the right/left orientation sensor) and the UDOS 326 (i.e. the up/down orientation sensor) are disposed within the imaging subsystem 204. Both the RLOS 324 and the UDOS 326 are physically coupled to the image sensor 304 and electrically coupled to the DSP 320. The RLOS 324 monitors whether the camera 200 is in a landscape orientation or a portrait orientation. If the camera 200 is in a portrait orientation, the RLOS 324 identifies whether the camera 200 has been rotated clockwise or counterclockwise, as viewed from the rear of the camera 200. In response to such camera 200 rotation, the RLOS 324 generates and transmits either a landscape signal, a portrait_left signal or a portrait_right signal to the DSP 320. More specifically, if the camera 200 is held in the landscape orientation shown in FIGS. 1A and 3B, the RLOS 324 generates the landscape signal, since the top 336 of the image sensor 304 corresponds to the "TOP" of the object 202. However, if the camera 200 is rotated 90° clockwise about the x-axis, as viewed from the rear of the camera 200 shown in FIG. 3B, the RLOS 324 generates the portrait_right signal, since now the right side 342 of the image sensor 304 corresponds to the "TOP" of the object 202. And, if the camera 200 is rotated 90° counter-clockwise about the x-axis, as viewed from the rear of the camera 200, the RLOS 324 generates the portrait_left signal, since now the left side 340 of the image sensor 304 corresponds to the "TOP" of the object 202.

The UDOS 326 monitors whether the camera 200 is in either a level orientation or an off-level orientation. In response to a movement of the camera 200, the UDOS 324 generates and transmits either a level signal or an off-level signal to the DSP 320. Specifically, if the camera 200 is held in the landscape orientation shown in FIG. 3B, the UDOS 324 generates the level signal, since the front 334 of the camera 200 directly faces the object 202. If the camera 200 is rotated more than 45° clockwise or counter-clockwise about the y-axis, shown in FIG. 3B, the UDOS 324 preferably generates the off-level signal, since the front 334 of the camera 200 now points either above or below the x-y plane. Alternative embodiments of the present invention can change the specific measure of rotation necessary to generate the off-level signal from 45° to any number from 0° to 180°.

Both the RLOS 324 and UDOS 326 sensors are preferably identical in their structure and function. Their placement relative to the image sensor 304 determines whether the signal generated by the orientation sensor is one of the RLOS 324 signals or the UDOS 326 signals. The DSP 320 receives both the RLOS 324 and the UDOS 326 signals and transmits them to the processing and storage subsystem 208 over the bus 206. While the preferred embodiment of the present invention incorporates the orientation sensors 324, 326, those skilled in the art will recognize that the orientation sensors 324, 326 are not required to practice the present invention, if the processing and storage subsystem 208 prompts the photographer for the camera's 200 orientation at the time an image is captured. Alternatively, an embodiment using only the RLOS 324 enables practicing of the present invention, but this alternative embodiment results in loss of the off-level signal. However, such an embodiment using only the RLOS 324 is still useful for most applications requiring only landscape and portrait orientation using an approximately level camera 200. A further alternative embodiment includes an RLOS 324 which only generates the landscape, portrait_left, or portrait_right signals if the camera 200 is within a predetermined level range.

Figure 4A:
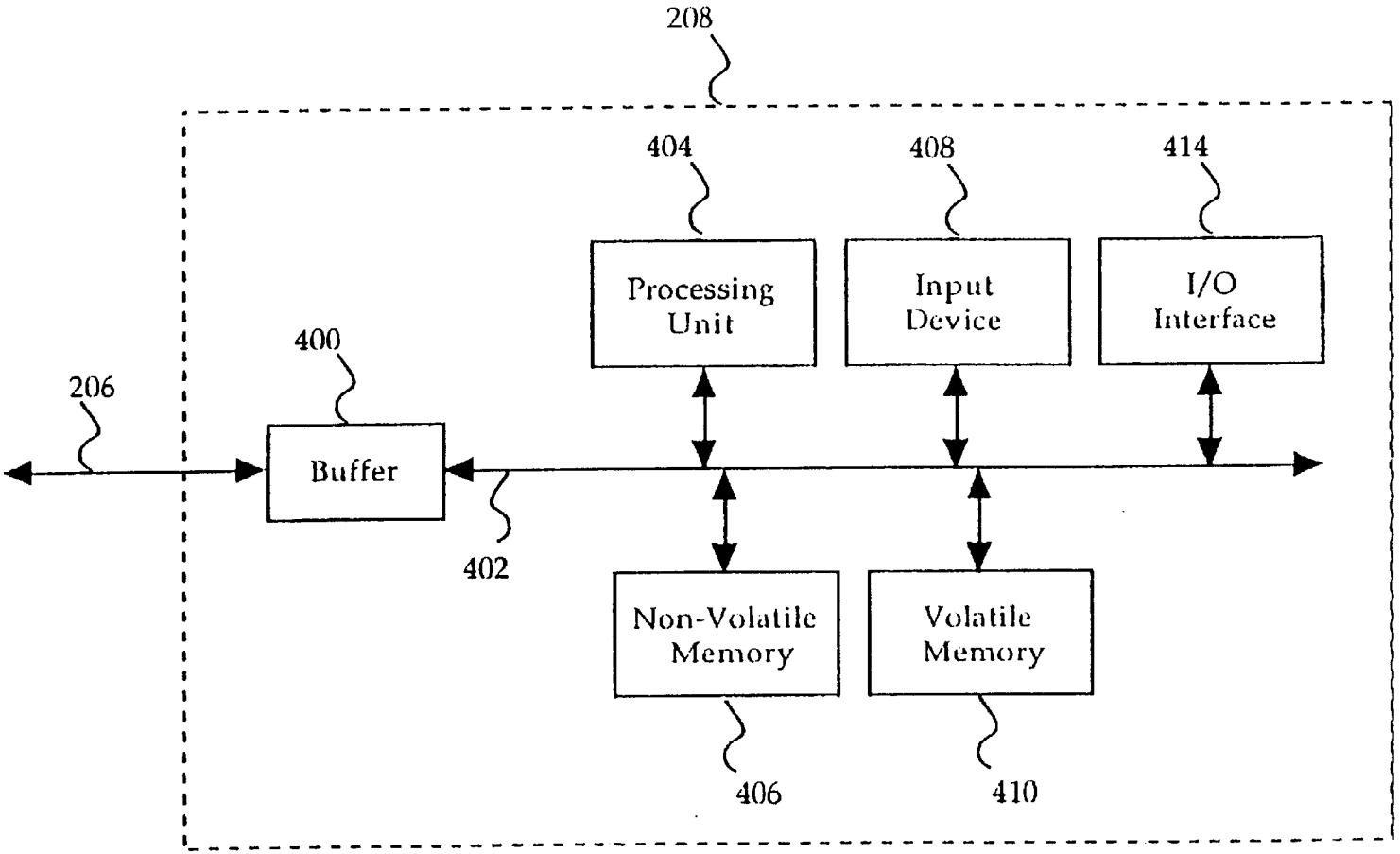
FIG. 4A, is a block diagram of a preferred embodiment of a processing and storage subsystem of the present invention.

Referring now to FIG. 4A, a block diagram is shown illustrating the processing and storage subsystem 208 of the present invention. The processing and storage subsystem 208 comprises a buffer 400, a processing unit 404, a non-volatile memory 406, an input device 408, a volatile memory 410 and an I/O interface 414, coupled together via an internal bus 402. In the preferred embodiment, the processing and storage subsystem 208 is conventionally embedded as part of the camera 200. Alternatively, the processing and storage subsystem 208 may be a desktop type computer.

The buffer 400 is preferably a first-in, first-out buffer for temporarily holding the captured image data and the imaging subsystem 204 control signals passed between the DSP 320 and the processing and storage subsystem 208. The buffer 400 has data lines that are coupled to both the bus 206 and the internal bus 402. The processing unit 404 executes programming instructions stored in the non-volatile memory 406 and the volatile memory 410 to perform various operations. The non-volatile memory 406 stores a set of computer readable program instructions for controlling how the processing unit 404 accesses, transforms and outputs the image data, as described in detail below with reference to FIG. 4D. While the non-volatile memory 406 is preferably a Read Only Memory (ROM), alternatively the non-volatile memory 406 could be replaced with a functionally equivalent computer useable medium such as: a compact disk and drive; a floppy disk and drive; or a memory card. Additional details on the function and operation of both the non-volatile memory 406 and the volatile memory 410 are provided below with reference to FIGS. 4B and 4D.

The input device 408 is preferably a series of control buttons, responsive to user inputs, which generates signals that are translated by the processing unit 404 into control signals to adjust the focus and other operating parameters of the imaging subsystem 204. As mentioned above, while the preferred embodiment of the camera 200 incorporates the RLOS 324 and UDOS 326, an alternative embodiment of the present invention prompts the user to manually input, via the input device 408, the imaging subsystem's 204 orientation at the time the captured image data was generated. Other alternative embodiments incorporating the automatic RLOS 324 and UDOS 326 sensors could provide for an override function that instructs the processing and storage subsystem 208 to ignore the orientation signals generated by the RLOS 324 and UDOS 326 sensors, enabling the user to retain full manual control over the final orientation of the captured image data on the image display 100. The I/O Interface 414 is coupled to the internal bus 402 and has an external port connector for coupling the processing and storage subsystem 208 with a host computer (not shown) for downloading image data stored in the volatile memory 410 and thus freeing up room in the volatile memory 410 for additional sets of processed image data. In the second and alternative embodiment discussed above where the processing and storage subsystem 208 is a desktop type computer, the input device 408 will also include a keyboard and mouse type controller.

Figure 4B:
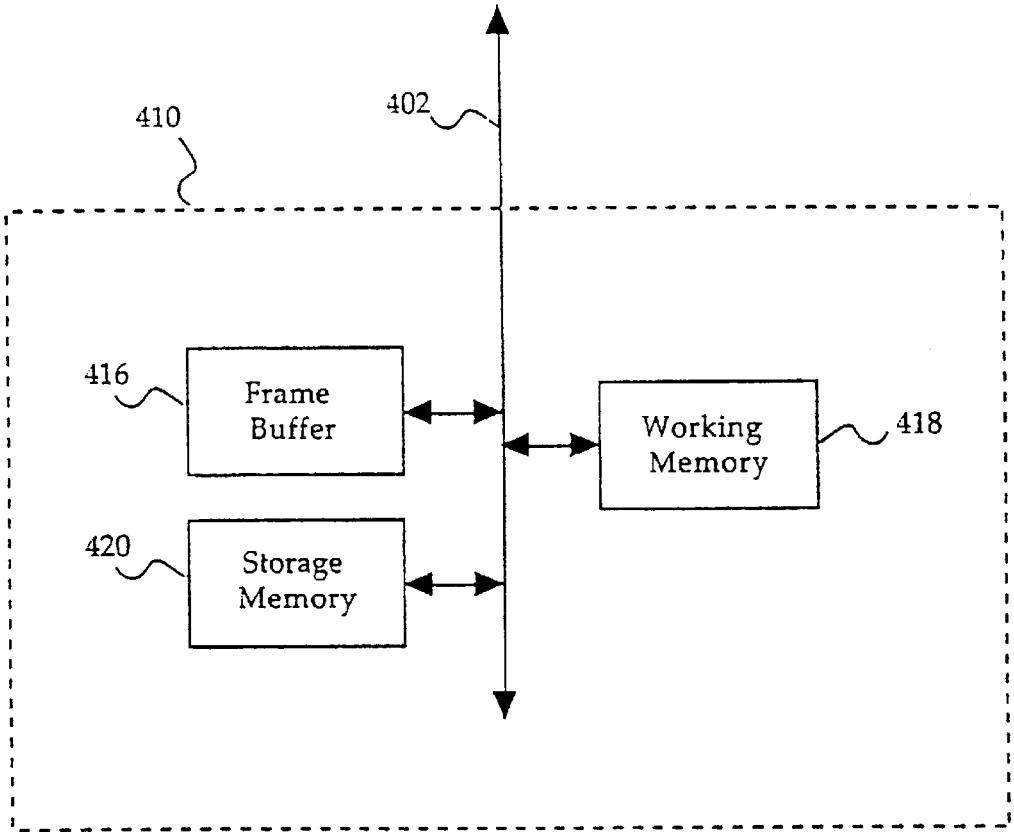
FIG. 4B, is a block diagram of a preferred embodiment of a volatile memory within the processing and storage subsystem.

Referring now to FIG. 4B, a block diagram is shown illustrating a volatile memory 410 within the processing and storage subsystem 208. The volatile memory 410 contains a frame buffer 416, working memory 418 and storage memory 420 coupled to the internal bus 402. The volatile memory 410 is preferably a Random Access Memory (RAM).

The frame buffer 416 is preferably comprised of a dedicated space of contiguous memory comprising an i-row by j-column area for storing image data. There is preferably a constant one-to-one correspondence between the pixels comprising the image sensor 304 array and the storage locations within the frame buffer 416 area. Alternatively, the pixel signals from the image sensor 304 array could be stored within the frame buffer 416 in a non-contiguous (i.e. sectored) memory format, as is commonly known in the art.

In the preferred embodiment, i and j are set equivalent to the size of the image sensor 304. Since the preferred image sensor 304 is a 481 by 641 array, i is set to 481 and j is set to 641. In alternative embodiments where the image sensor 304 is only a 480 by 640 array, the frame buffer 416 will still preferably be a 481 by 641 array since, as is discussed below, an extra row and column is generated by the processing and storage subsystem 208.

The working memory 418 preferably provides a temporary space for storing data received from the input device 408 and for data generated by the processing unit 404. The working memory 418 also contains additional memory for storing the RLOS 324 and UDOS 326 signals at the time the image data was captured by the image sensor 304; and additional information conventionally associated with the capture process, such as exposure and focus settings, time and date, statistical data, and the presence of any defective pixels, rows or columns within the image sensor 304.

The storage memory 420 preferably provides space for storing multiple sets of image data, until the images are off-loaded from the camera 200 via the I/O interface 414. The storage memory 420 sets a maximum image data holding capacity of the camera 200. Alternatively, additional memory cards could also be coupled to the internal bus 402, providing even more image data storage capability. Such an additional memory card could be a non-volatile flash memory card.

Figure 4C:
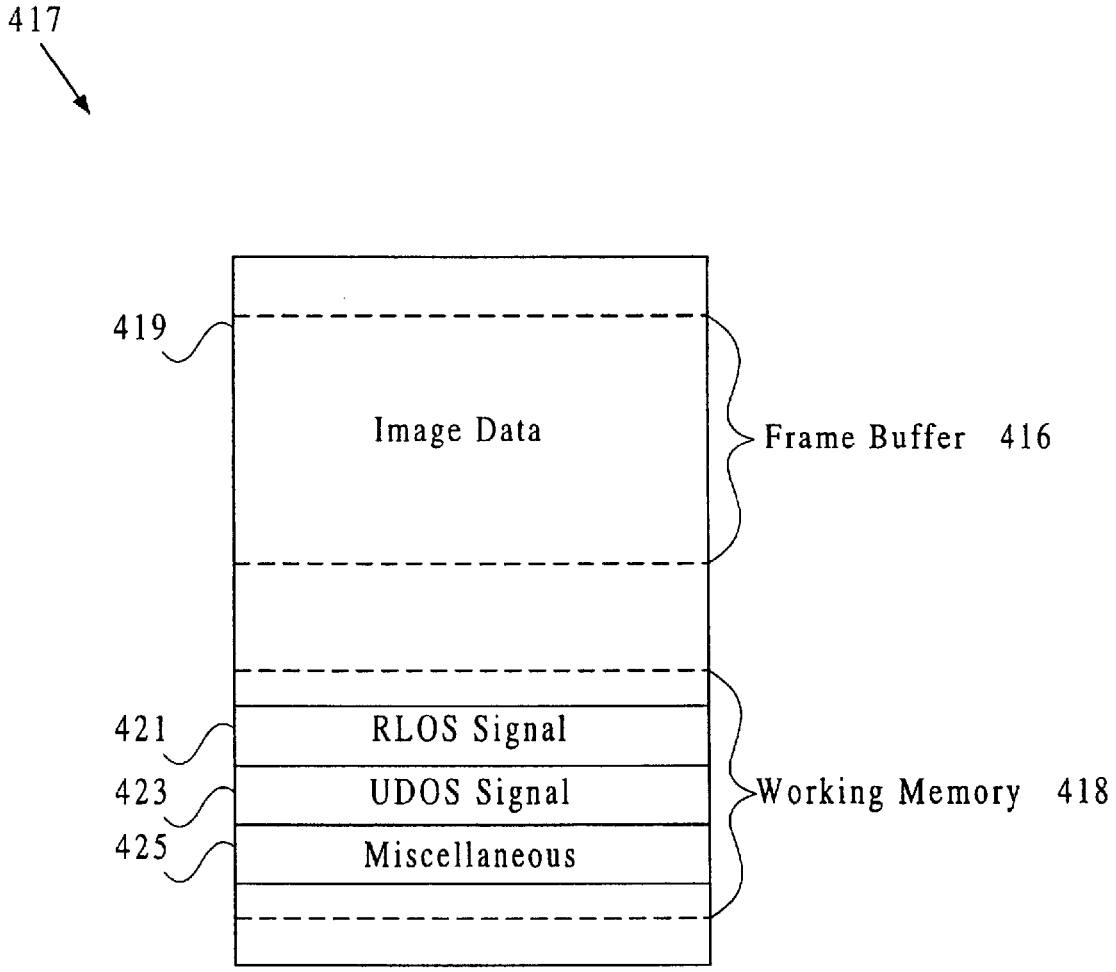
FIG. 4C, is a block diagram of a preferred embodiment of a frame buffer data structure within a frame buffer.

Referring now to FIG. 4C, a block diagram is shown illustrating a memory map of a volatile memory data structure 417 within the volatile memory 410. The volatile memory data structure 417 comprises an image data field 419 for storing the captured image data, an RLOS signal data field 421 for storing the RLOS 324 signal, an UDOS signal data field 423 for storing the UDOS 326 signal and a miscellaneous data field 425 for storing the exposure and focus settings, time and date, statistical data, and the presence of any defective image sensor 304 pixels, rows or columns. The interactions of each of all these data fields 419, 421, 423, 425 with the camera 200 is described in detail below.

Figure 4D:
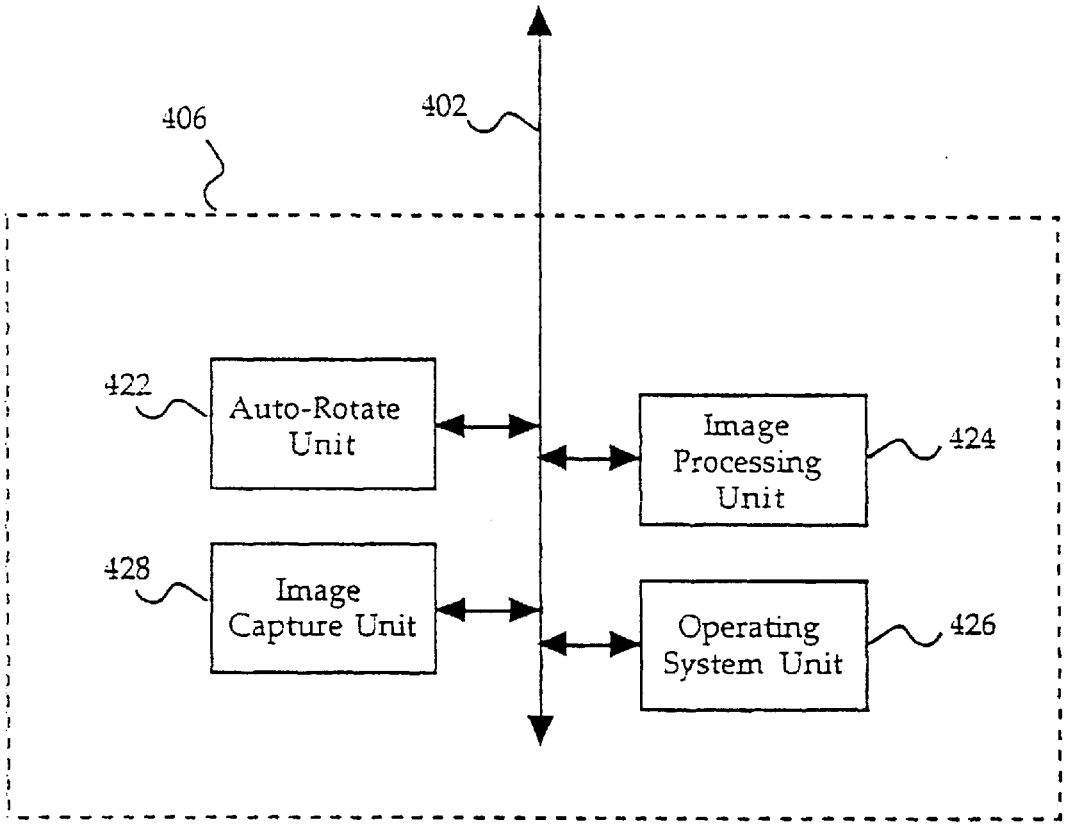
FIG. 4D, is a block diagram of the preferred embodiment of a non-volatile memory within the processing and storage subsystem.

Referring now to FIG. 4D, a block diagram is shown illustrating the non-volatile memory 406 within the processing and storage subsystem 208. The non-volatile memory 406 comprises an auto-rotate unit 422, an image processing unit 424, an image capture unit 428 and an operating system unit 426.

The image capture unit 428 controls the imaging subsystem's 204 focus and aperture settings; captures the image data; routes the image data into the frame buffer 416; routes the exposure and focus settings, time and date, statistical data, and the presence of any defective image sensor 304 pixels, rows or columns into the miscellaneous data field 425; generates additional rows and columns of image data within the frame buffer 416 if required; monitors the RLOS 324 and UDOS 326; and sets the RLOS signal 421 data field and the UDOS signal 423 data field based on the RLOS 324 and UDOS 326 outputs. In the preferred embodiment the image capture unit 428 corrects any pixel defects within the image sensor 304 using the information stored in the miscellaneous data field 425 before passing the image data to the auto-rotate unit 422. In an alternative embodiment, image processing unit 424 corrects any pixel defects within the image sensor 304 using the information stored in the miscellaneous data field 425 after receiving the image data from the auto-rotate unit 422. In this alternative embodiment, the defective image sensor 304 pixel information must also be rotated by the auto-rotate unit 422 in the same manner as for the image data, described below.

The image capture unit 428 preferably is designed in two embodiments, a hardware embodiment and a software embodiment; however, the hardware embodiment is preferred.

Hardware Embodiment

In the hardware embodiment, the image sensor 304 is comprised of at least one more extra row and column than the image processing unit 424 is designed to process. Thus, if the image processing unit 424 is designed to process a 480 by 640 pixel signal array, then the image sensor 304 must be at least a 481 by 641 pixel array (i.e. "i" is 481 and "j" is 641 in FIG. 3C). The discussion that follows on the auto-rotate unit 422 makes clear when and why the additional row and column is required.

Software Embodiment

The software embodiment is required when the image sensor 304 lacks any additional rows and columns beyond those that the image processing unit 424 is designed to process. For Bayer pattern image processing, the image capture unit 428 must generate an additional row and column of image data. (For non-Bayer pattern image data, a straightforward rotation is performed as is described below and an additional row and column is not required.) Thus, for example, if the image sensor 304 is comprised of a 480 by 640 pixel array and the image processing unit 424 is designed to process a 480 by 640 array, then the image capture unit 428 must generate an additional row and column of pixels. In the preferred software embodiment, the additional row generated corresponds to row $r_i$ (i.e. GRGRGR) in FIG. 3C and the additional column generated corresponds to column $c_j$ (i.e. GBGBGB) in FIG. 3C. The additional row and column may be generated in any number of ways, including: setting the additional pixels to black; creating a duplicate of a nearby line of pixels with the same pixel pattern (i.e. two pixel lines over); generating a duplicate of the nearest color (i.e. G's would be copied from one pixel line over while R's or B's would be copied from two pixel lines over); setting the pixel values based on a filtering algorithm which looks at a number of nearby pixels; or setting the additional row and column of pixels randomly.

The auto-rotate unit 422 transforms the captured image data into the rotated image data for further processing by the image processing unit 424. The image processing unit 424 receives the rotated image data from the auto-rotate unit 422 and transforms it into processed image data, ready for saving in the storage memory 420. The operating system unit 426 is coupled to the internal bus 402 and preferably comprises a conventional set of program instructions for controlling the configuration and usage of the computer's 208 hardware resources. The operations performed by the auto-rotate unit 422 and the image processing unit 424 are described in more detail below.

Figure 5A:
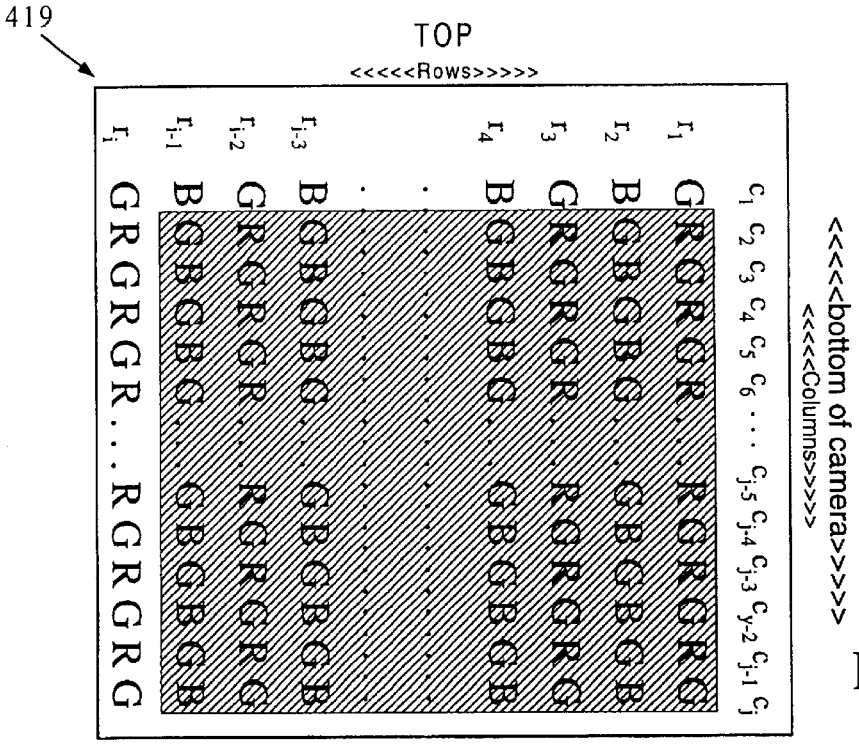
FIG. 5A, is a graphical representation of a preferred embodiment of portrait_left image data within the frame buffer data structure.
Figure 5B:
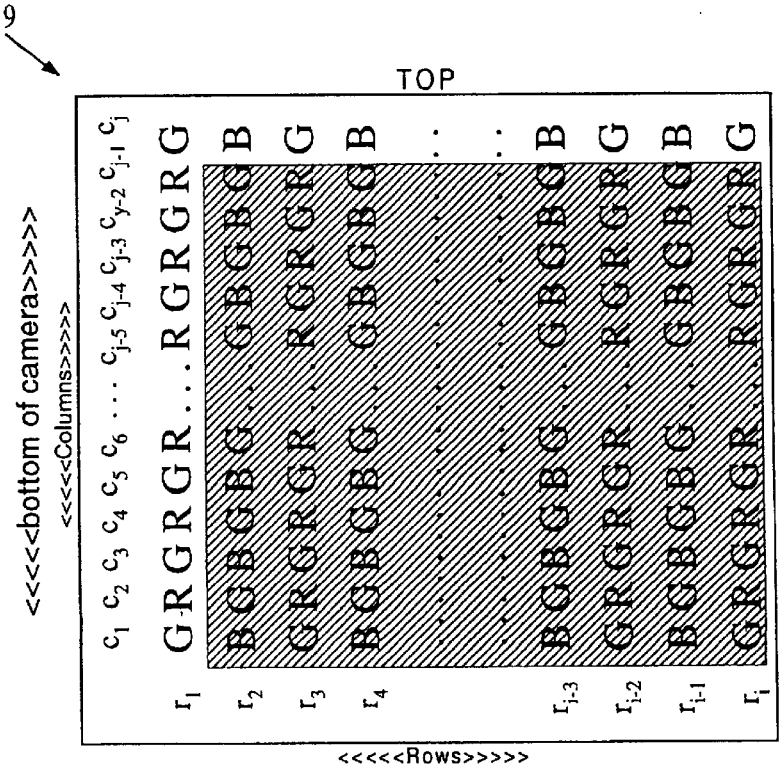
FIG. 5B, is a graphical representation of a preferred embodiment of portrait_right image data within the frame buffer data structure.
Figure 5C:
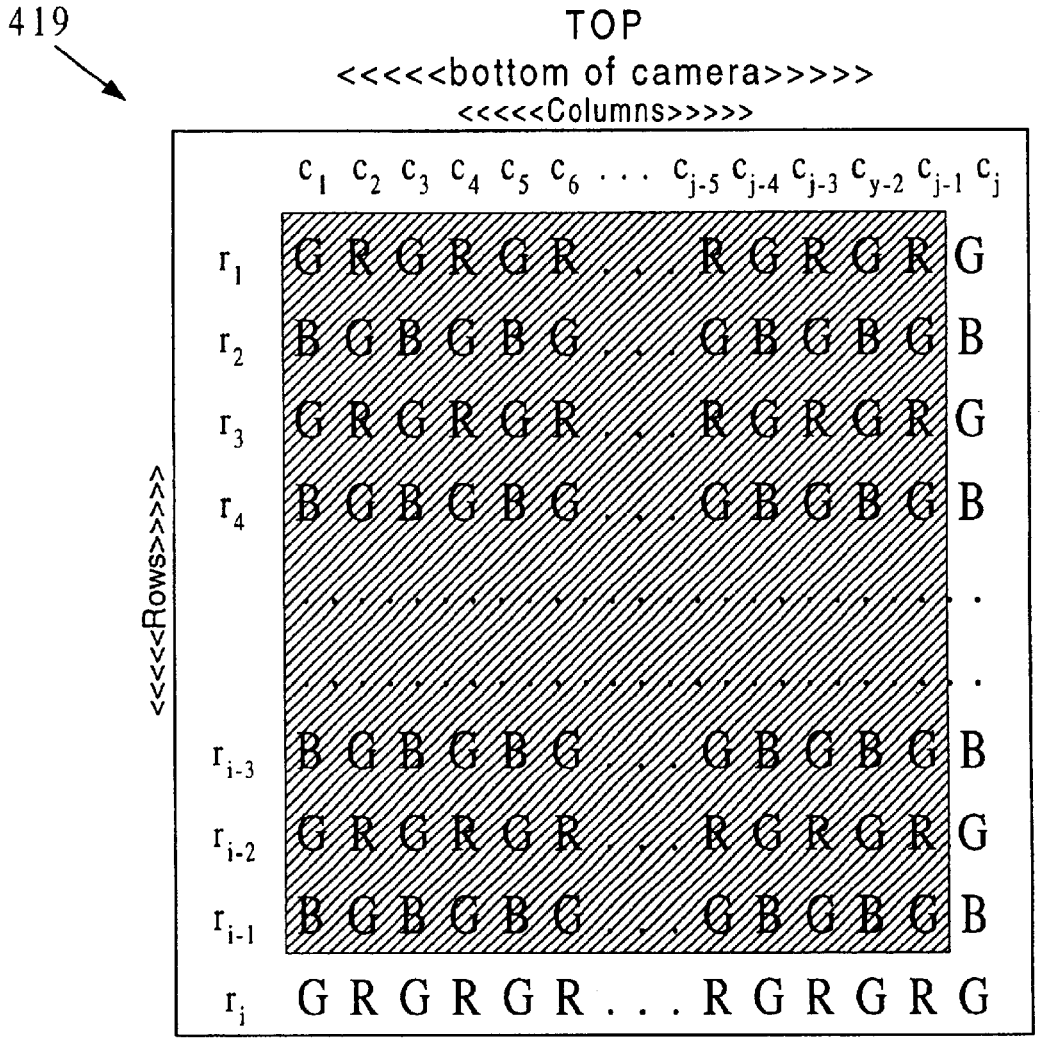
FIG. 5C, is a graphical representation of a preferred embodiment of landscape image data within the frame buffer data structure.

Referring now to FIGS. 5A, 5B and 5C, a graphical representation is shown in FIG. 5A illustrating portrait_left image data within the frame buffer 416; a graphical representation is shown in FIG. 5B illustrating portrait_right image data within the frame buffer 416; and a graphical representation is shown in FIG. 5C illustrating landscape image data within the frame buffer 416. FIGS. 5A, 5B and 5C all show the same image data 419 within the frame buffer data structure 417 filled with different sets of captured image data and graphically positioned in the orientation in which the camera 200 was held at the time the captured image data was generated. As will be discussed in detail below, the shaded areas represent a subset of pixel signals within the image data field 419 that the auto-rotate unit 422 selects to be sent to the image processing unit 424 as the rotated image data.

The auto-rotate unit 422 preferably comprises program instructions stored in the non-volatile memory 406 that are executed by the processing unit 404. The auto-rotate unit 422 controls the flow of data between the frame buffer 416 and the image processing unit 424. First, the auto-rotation unit 422 accesses the RLOS signal 421 data field and UDOS signal 423 data field from the frame buffer data structure 417; and, based on this orientation data, selects either a portrait_left spooling routine, a portrait_right spooling routine or a landscape spooling routine. The spooling routines select-out and feed the captured image data stored in the image data field 419 to the image processing unit 424. "Spooling" is here defined as a routine for transferring data from one unit or device to a second unit or device. It is through these spooling routines that the auto-rotate unit 422 transforms the captured image data into the rotated image data. While the effect of the auto-rotate unit 422 is only described below with reference to the captured image data, some of the additional information stored in the working memory 418 (such as the location of any defective pixels, rows or columns within the image sensor 304) will also be rotated, as described above. This additional information is then used by the image processing unit 424. Alternatively, a defective pixel correction algorithm can be applied to the image data prior to rotation of the image data. Each of the different spooling routines are described in detail below.

First, the auto-rotate unit 422 determines the image sensor's 304 orientation at the time the image was captured, by accessing the RLOS signal 421 and UDOS signal 423 data fields. Next, if the RLOS signal 421 data field contains a portrait_left signal and the UDOS signal 423 data field contains a level signal, the auto-rotate unit 422 selects the portrait_left spooling routine. However, if the RLOS signal 421 data field contains a portrait_right signal and the UDOS signal 423 data field contains a level signal, the auto-rotate unit 422 selects the portrait_right spooling routine. Lastly, if the RLOS signal 421 data field contains a landscape signal and the UDOS signal 423 data field contains a level signal, or whenever the UDOS signal 423 data field contains an off-level signal, regardless of what the RLOS signal 421 data field contains, the auto-rotate unit 422 selects the landscape spooling routine. Each of the three spooling routines within the auto-rotate unit 422 are now discussed below.

If the portrait_left spooling routine is selected, the auto-rotate unit 422 interprets the captured image data within the image data field 419 as shown in FIG. 5A. FIG. 5A shows an i-row by j-column set of captured image data in a portrait_left orientation. As shown, the "TOP" of the portrait_left orientation corresponds to column $c_2$. Note that the "row" and "column" designations defined for the image sensor 304 in FIG. 3C are retained for clarity in FIGS. 5A, 5B and 5C even though the camera has been rotated into the portrait_left orientation. Conventional image processing units are designed to receive image data in a constant pixel pattern format. Using the Bayer pattern format (assumed for the purposes of this discussion) the image processing unit 424 must receive the image data from the image data field 419 starting with a "GRGRGR" line and followed by a "BGBGBG" line, in an alternating line-by-line pattern. Therefore, a subset of the image data field 419 is selected by the portrait_left spooling routine, as shown by the shaded gray area in FIG. 5A, to be sent to the image processing unit 424. The shaded area of FIG. 5A is defined from rows $r_1$ to $r_{i-1}$, and from columns $c_2$ to $c_j$. The total array size of the shaded area is therefore comprised of i−1 number of rows and j−1 number of columns. Next, the portrait_left spooling routine defines the shaded area of $c_2$ as the top line of the rotated image data and configures the image processing unit 424 to accept a line length of i−1 pixels. The portrait_left spooling routine first transfers the pixel signal in the image data field 419 location ($r_{i-1}$, $c_2$) to the image processing unit 424. Decrementing the row number by one, the portrait_left spooling routine next transfers the pixel signal at location ($r_{i-2}$, $c_2$) to the image processing unit 424, and so on until pixel ($r_1$, $c_2$) has been transferred. The portrait_left spooling routine then increments the column by one to $c_3$ and resets the row to $r_{i-1}$ in preparation for spooling the next line of pixel signals (having a length of i−1) to the image processing unit 424, in the same manner as the first line (having a length of i−1) was spooled. The portrait_left spooling routine continues to increment the column number and spool the next line of pixel signals (having a length of i−1) to the image processing unit 424 until column $c_j$ has been spooled. The pixel signals within either row $r_i$ or column $c_1$ are not sent to the image processing unit 424 since the image processing unit 424 is preferably designed to process only an i−1 by j−1 array of pixel signals. As a result of this spooling sequence, the entire set of pixel signals representing a portrait_left image has been transferred to the image processing unit 424. Furthermore, due to this specific spooling sequence, the portrait left image will be displayed on the image display 100 so that the "TOP" of the portrait_left image corresponds to the top 102 of the image display 100.

If the portrait_right spooling routine is selected, the auto-rotate unit 422 interprets the captured image data within the image data field 419 as shown in FIG. 5B. FIG. 5B shows an i-row by j-column set of captured image data in a portrait_right orientation. As shown, the "TOP" of the portrait_right orientation corresponds to column $c_{j-1}$. A subset of the image data field 419 is selected by the portrait_right spooling routine, as shown by the shaded gray area in FIG. 5B, to be sent to the image processing unit 424. The shaded area of FIG. 5B is defined from rows $r_2$ to $r_i$, and from columns $c_1$ to $c_{j-1}$. The total array size of the shaded area is therefore comprised of i−1 number of rows and j−1 number of columns. Next, the portrait_right spooling routine defines the shaded area of $c_{j-1}$ as the top line of the rotated image data and configures the image processing unit 424 for a line length of i−1 pixels. The portrait_right spooling routine first transfers the pixel signal in the image data field 419 location ($r_2$, $c_{j-1}$) to the image processing unit 424. Incrementing the row number by one, the portrait_right spooling routine next transfers the pixel signal at location ($r_3$, $c_{j-1}$) to the image processing unit 424, and so on until pixel ($r_i$, $c_{j-1}$) has been transferred. The portrait_right spooling routine then decrements the column by one to $c_{j-2}$ and resets the row to $r_2$ in preparation for spooling the next line of pixel signals (having a length of i−1) to the image processing unit 424, in the same manner as the first line (having a length of i−1) was spooled. The portrait_right spooling routine continues to decrement the column number and spool the next line of pixel signals (having a length of i−1) to the image processing unit 424 until column $c_1$ has been spooled. Thus, the entire set of pixel signals representing a portrait_right image has been transferred to the image processing unit 424. As a result of this specific spooling sequence, the portrait_right image will be displayed on the image display 100 so that the "TOP" of the portrait_right image corresponds to the top 102 of the image display 100.

If the landscape spooling routine is selected, the auto-rotate unit 422 interprets the captured image data within the image data field 419 as shown in FIG. 5C. FIG. 5C shows an i-row by j-column set of captured image data in a landscape orientation. As shown, the "TOP" of the landscape orientation corresponds to $r_1$. A subset of the image data field 419 is selected by the landscape spooling routine, as shown by the shaded gray area in FIG. 5C, to be sent to the image processing unit 424. The shaded area of FIG. 5C is defined from rows $r_1$ to $r_{i-1}$, and from columns $c_1$ to $c_{j-1}$. The total array size of the shaded area is therefore comprised of i−1 number of rows and j−1 number of columns. Next, the landscape spooling routine defines the shaded area of $r_1$ as the top line of the rotated image data and configures the image processing unit 424 for a line length of j−1 pixels. Alternatively, the shaded gray area representing the rotated image data could be positioned over different sets of pixel signals within the image data field 419, again subject to the constraint that the top line begin with the "GRGRGR" pattern. The landscape spooling routine first transfers the pixel signal in the image data field 419 location ($r_1$, $c_1$) to the image processing unit 424. Incrementing the column number by one, the landscape spooling routine next transfers the pixel signal at location ($r_1$, $c_2$) to the image processing unit 424, and so on until pixel ($r_1$, $c_{j-1}$) has been transferred. The landscape spooling routine then increments the row by one to $r_2$ and resets the column to $c_1$ in preparation for spooling the next line of pixel signals (having a length of j−1) to the image processing unit 424, in the same manner as the first line (having a length of j−1) was spooled. The landscape spooling routine continues to increment the row number and spool the next line of pixel signals (having a length of j−1) to the image processing unit 424 until row $r_{i-1}$ has been spooled. Thus, the entire set of pixel signals representing a landscape image has been transferred to the image processing unit 424. As a result of this specific spooling sequence, the landscape image will be displayed on the image display 100 so that the "TOP" of the landscape image corresponds to the top 102 of the image display 100.

Also as introduced above, the image processing unit 424 preferably comprises program instructions stored in the non-volatile memory 406 that are executed using the processing unit 404. The image processing unit 424 receives the rotated image data from the auto-rotate unit 422, performs conventional image processing operations (such as white balancing, reconstruction, color correction, gamma correction, sharpening and compression) on the rotated image data; generates processed image data; and either saves the processed image data to the storage memory 420 or outputs it to a host computer (not shown) via the I/O interface 414. As was discussed above, the image processing unit 424 is preferably implemented such that it must receive all the image data spooled from the frame buffer 416 starting with a "GRGRGR" line followed by a "BGBGBG" line in an alternating line-by-line pattern. This is the image processing unit's 424 design limitation which drives the auto-rotate unit's 422 particular pixel selection routines described above. Alternatively, a different image processing unit 424 could be implemented which requires that the image data be spooled from the frame buffer 416 starting with a "GBGBGB" line followed by a "RGRGRG" line or any combination of the Bayer pattern.

Those skilled in the art will also recognize that alternate embodiments of the present invention that do not use the Bayer pattern may still use the teachings of present invention to rotate their image data. In such alternative embodiments the auto-rotate unit 422 performs a straightforward rotation of the image data since such alternative image processing units 424 may accept pixel signals in any orientation. Thus for the straightforward rotation where the shaded gray area of FIG. 5C represents the image data, the portrait_left spooling routine would start with pixel signal ($r_{i-1}$, $c_1$), spool column $c_1$, increment the column to $c_2$, spool column $c_2$ and so on; the portrait_right spooling routine would start with pixel signal ($r_1$, $c_{j-1}$), spool column $c_{j-1}$, decrement the column to $c_{j-2}$, spool column $c_{j-2}$ and so on; and the landscape spooling routine would start with pixel signal ($r_1$, $c_1$), spool row $r_1$, increment the row to $r_2$, spool row $r_2$ and so on. In all three cases above, the extra or provided row $r_i$ and extra or provided column $c_j$ would not be transferred.

Referring now to FIGS. 6A, 6B, 6C and 6D, a flowchart of a preferred method for rotating the display orientation of a captured image is shown. The method begins in FIG. 6A with step 600 where the image capture unit 428 captures a set of image data and a set of image sensor 304 orientation data approximately simultaneously. The RLOS 421 and UDOS 423 orientation signals are recorded when the image data capture occurs in order to insure that the orientation sensor information accurately reflects the actual position of the image sensor 304. In step 602, the image capture unit 428 transfers the captured image data and the image sensor 304 orientation data into the volatile memory 410. In Step 603, the image capture unit 428 generates an additional row and column of image data if the captured image data does not already include an extra row and column of image data. In Step 604, the auto-rotate unit 422 determines the orientation of the captured image data. If in step 606 the captured image data is in a portrait_left orientation, the method proceeds to step 612, otherwise the method continues to step 608. If in step 608 the captured image data is in a portrait_right orientation, the method proceeds to step 628, otherwise the method proceeds to step 644.

Figure 6A:
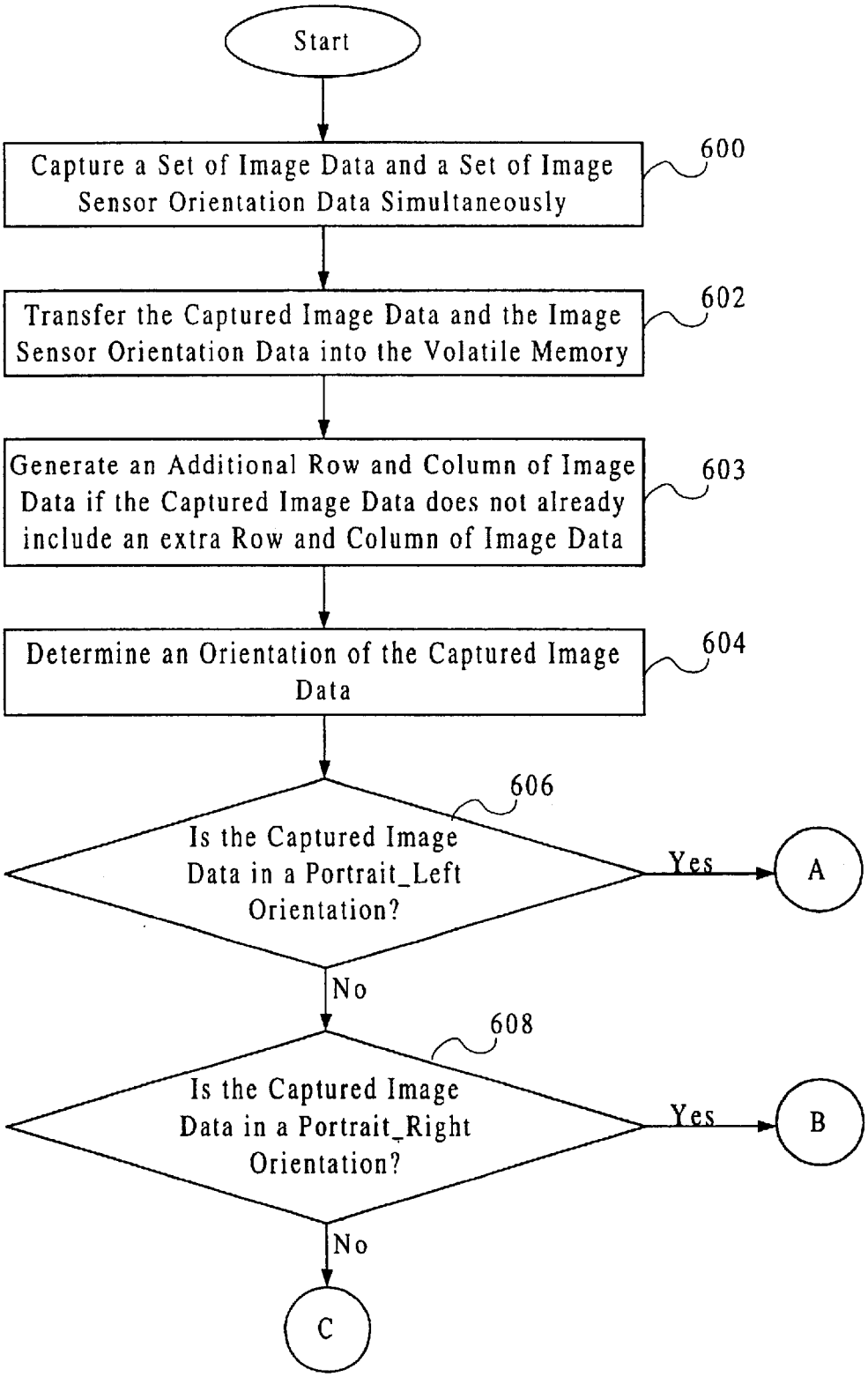
FIGS. 6A, 6B, 6C and 6D, are a flowchart of a preferred method for rotating the display orientation of a captured image.
Figure 6B:
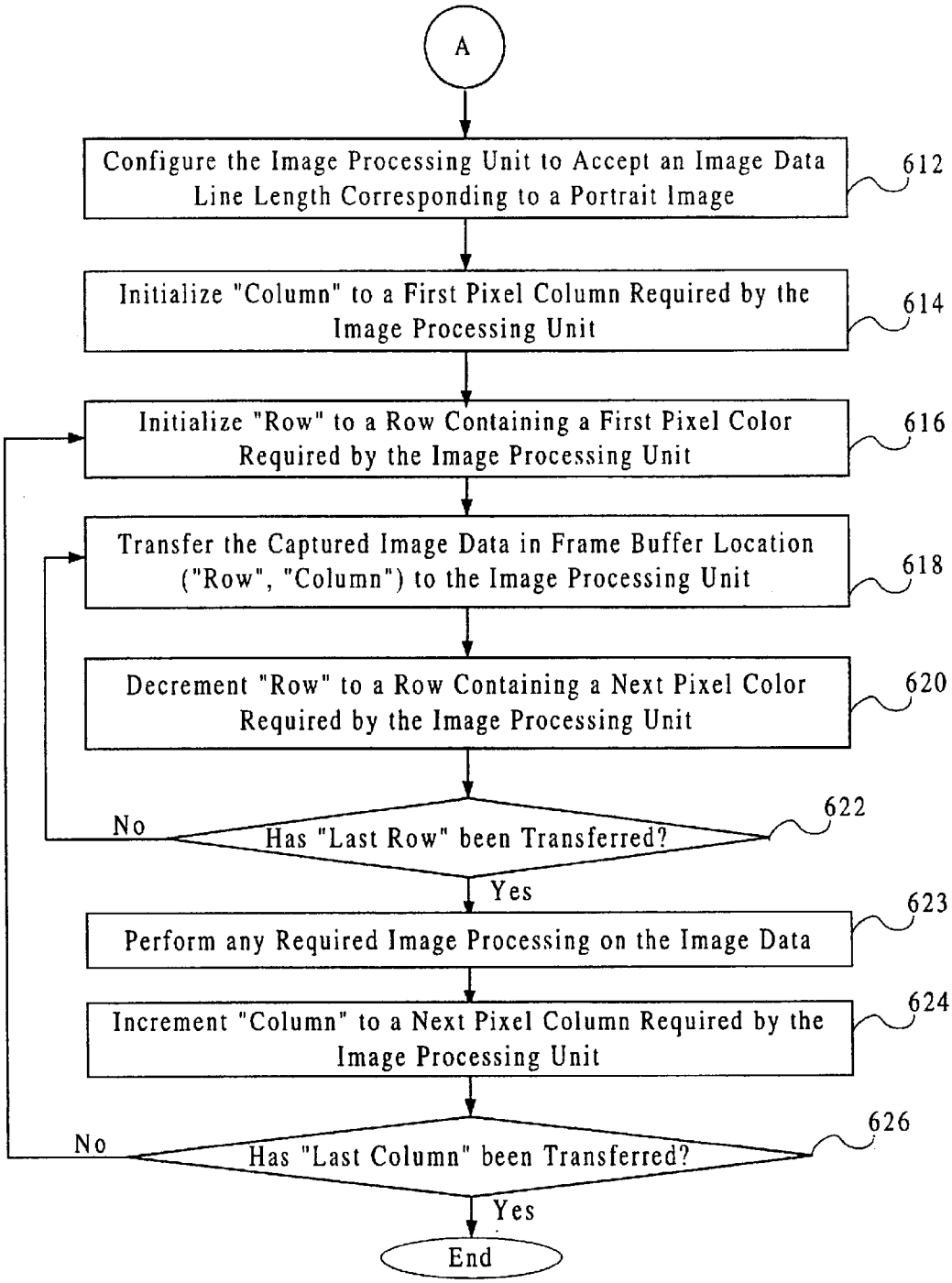

In step 612 of FIG. 6B, the auto-rotate unit 422 configures the image processing unit 424 to accept an image data line length corresponding to a portrait_left image. In step 614, the auto-rotation unit 422 initializes a variable named "column" stored in the working memory 418 to a first pixel column (i.e. to column $c_2$), within the image data field 419, required by the image processing unit 424. In step 616, the auto-rotation unit 422 initializes a variable named "row" stored in the working memory 418 to a row (i.e. to row $r_{i-1}$) within the image data field 419 containing a first pixel color required by the image processing unit 424. Next, in step 618, the auto-rotate unit 422 transfers the captured image data in the image data field 419 location ($r_{row}$, $c_{column}$) to the image processing unit 424. In step 620, the auto-rotate unit 422 decrements "row" to a row containing a next pixel color required by the image processing unit 424. In step 622, if "last row" has been transferred, the method proceeds to step 623, otherwise the method returns to step 618. In the preferred embodiment "last row" is "$r_1$" as shown in FIG. 5A. When "last row" has been transferred in step 622, an entire line of portrait_left image data has been transferred to the image processing unit 424. In step 623 the image processing unit 424 performs any required image processing on the transferred image data. Step 624 then increments "column" to a next pixel column required by the image processing unit 424. Finally, if in step 626 "last column" has not yet been transferred the method returns to step 616, otherwise the method ends. In the preferred embodiment "last column" is "$c_j$," as shown in FIG. 5A.

Figure 6C:
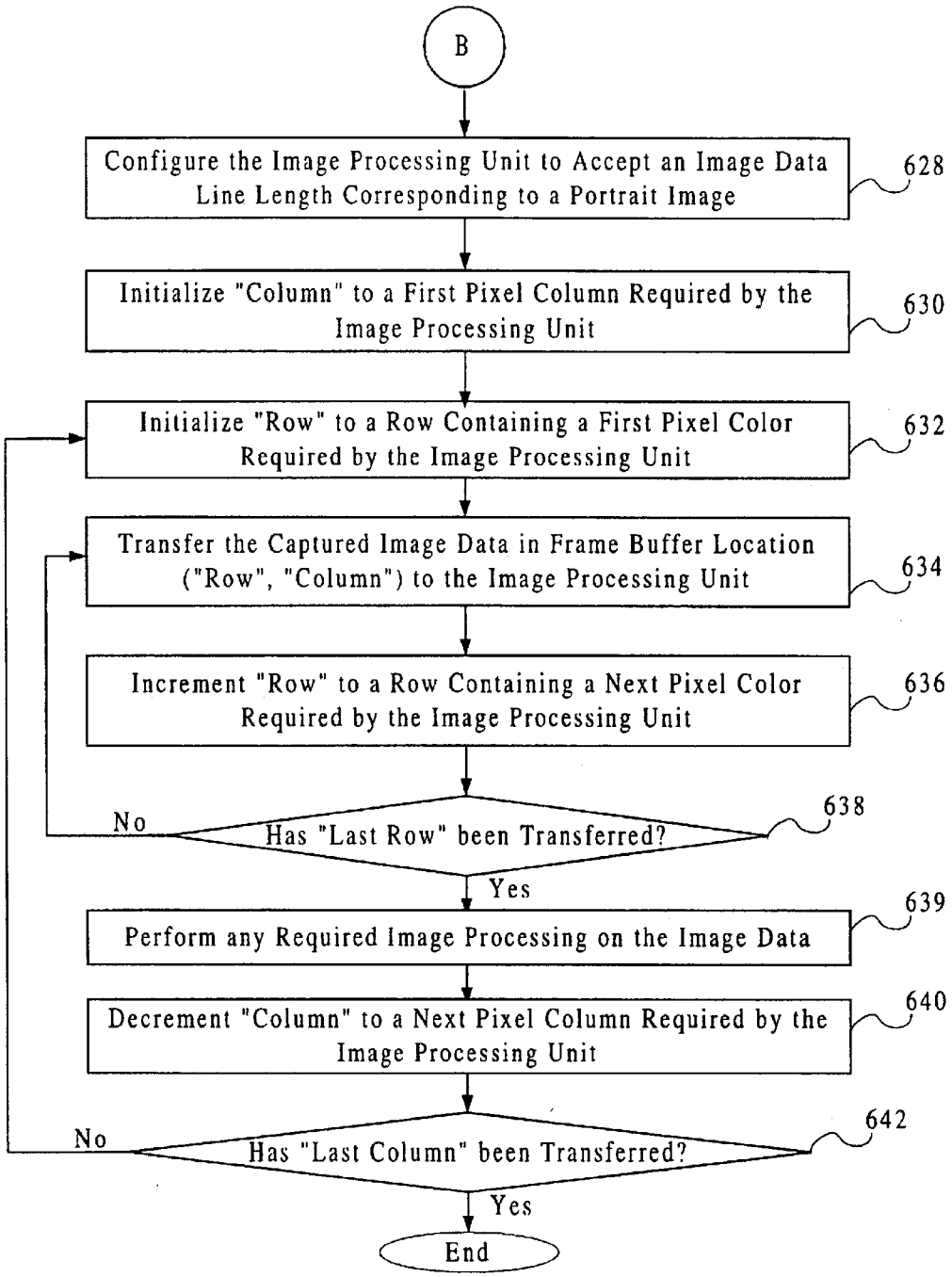

In step 628 of FIG. 6C, the auto-rotate unit 422 configures the image processing unit 424 to accept an image data line length corresponding to a portrait_right image. In step 630, the auto-rotation unit 422 initializes a variable named "column" stored in the working memory 418 to a first pixel column (i.e. to column $c_{j-1}$), within the image data field 419, required by the image processing unit 424. In step 632, the auto-rotation unit 422 initializes a variable named "row" stored in the working memory 418 to a row (i.e. to row $r_2$) within the image data field 419 containing a first pixel color required by the image processing unit 424. Next, in step 634, the auto-rotate unit 422 transfers the captured image data in the image data field 419 location ($r_{row}$, $c_{column}$) to the image processing unit 424. In step 636, the auto-rotate unit 422 increments "row" to a row containing a next pixel color required by the image processing unit 424. In step 638, if "last row" has been transferred, the method proceeds to step 639, otherwise the method returns to step 634. In the preferred embodiment "last row" is "$r_i$," as shown in FIG. 5B. When "last row" has been transferred in step 638, an entire line of portrait_right image data has been transferred to the image processing unit 424. In step 639 the image processing unit 424 performs any required image processing on the transferred image data. Step 640 then decrements "column" to a next pixel column required by the image processing unit 424. Finally, if in step 642 "last column" has not yet been transferred the method returns to step 632, otherwise the method ends. In the preferred embodiment "last column" is "$c_1$," as shown in FIG. 5B.

Figure 6D:
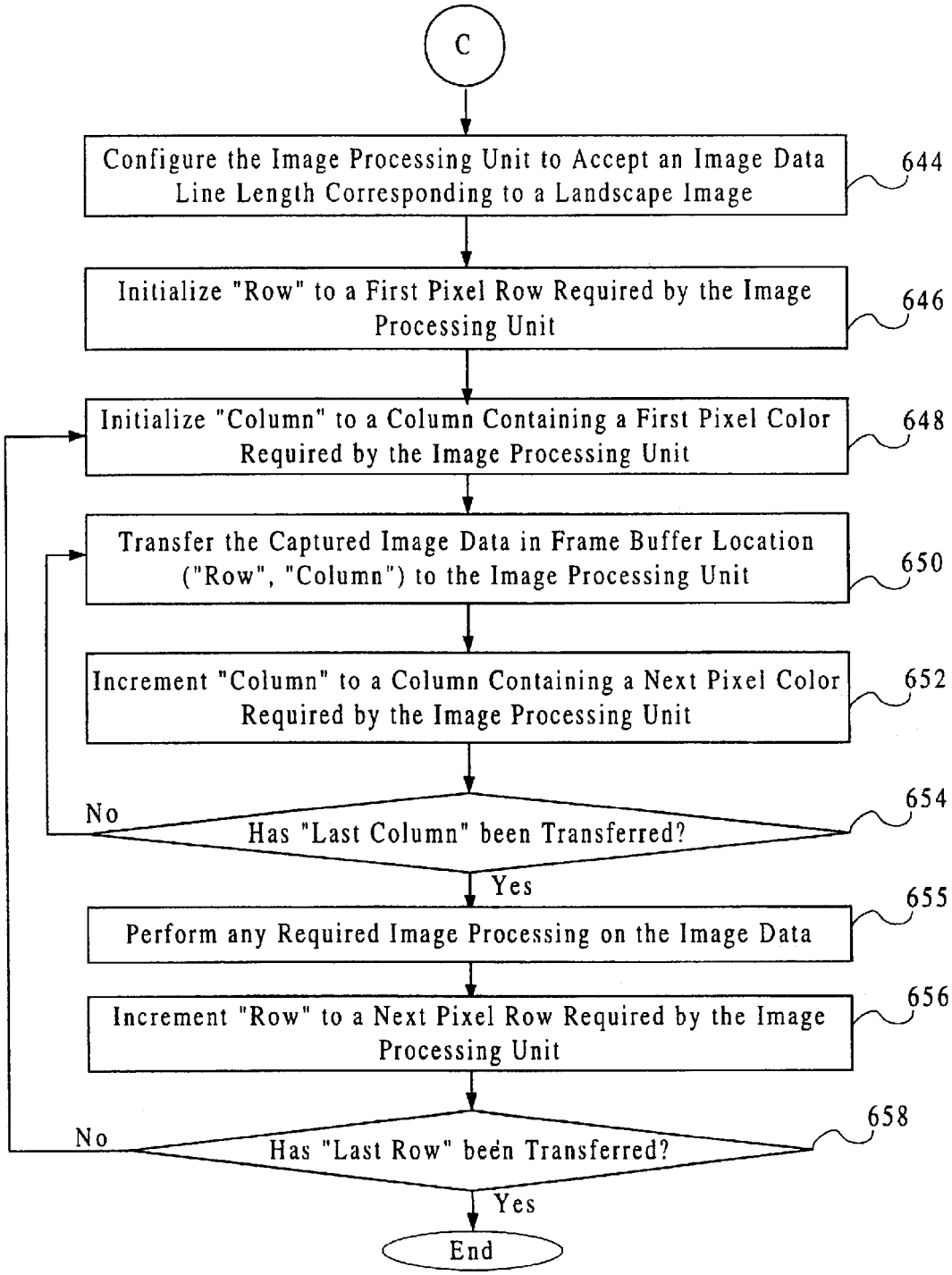

In step 644 of FIG. 6D, the auto-rotate unit 422 configures the image processing unit 424 to accept an image data line length corresponding to a landscape image. In step 646, the auto-rotation unit 422 initializes a variable named "row" stored in the working memory 418 to a first pixel row (i.e. to row $r_1$), within the image data field 419, required by the image processing unit 424. In step 648, the auto-rotation unit 422 initializes a variable named "column" stored in the working memory 418 to a column (i.e. to column $c_1$) within the image data field 419 containing a first pixel color required by the image processing unit 424. Next, in step 650, the auto-rotate unit 422 transfers the captured image data in the image data field 419 location ($r_{row}$, $c_{column}$) to the image processing unit 424. In step 652, the auto-rotate unit 422 increments "column" to a column containing a next pixel color required by the image processing unit 424. In step 654, if "last column" has been transferred, the method proceeds to step 655, otherwise the method returns to step 650. In the preferred embodiment "last column" is "$c_{j-1}$," as shown in FIG. 5C. When "last column" has been transferred in step 654, an entire line of landscape image data has been transferred to the image processing unit 424. In step 655 the image processing unit 424 performs any required image processing on the transferred image data. Step 656 then increments "row" to a next pixel row required by the image processing unit 424. Finally, if in step 658 "last row" has not yet been transferred the method returns to step 648, otherwise the method ends. In the preferred embodiment "last row" is "$r_{i-1}$," as shown in FIG. 5C.

While the present invention has been described with reference to certain preferred embodiments, those skilled in the art will recognize that various modifications may be provided. For instance, while the preferred embodiment of the present invention selects and processes the captured image data as a rectangular array, alternate embodiments could select and process the image data as an array of tiles rather than lines. Furthermore, by transferring the pixels signals to the image processing unit 424 in a different order, a mirror image or an upside-down image of the captured image data can be presented on the image display 100. Lastly, while the preferred embodiment is implemented in software, those skilled in the art would readily recognize that a hardware equivalent implementation would also be acceptable. These and other variations upon and modifications to the preferred embodiment are provided for by the present invention which is limited only by the following claims.

What is claimed is:

1. An apparatus for rotating a display orientation of captured image data representative of an object, the apparatus comprising:

an image sensor, for generating said captured image data;

an orientation sensor coupled to said image sensor, for generating a signal corresponding to the position of the image sensor relative to said object;

a memory, having an auto-rotate unit comprising program instructions for selectively transforming said captured image data into rotated image data in response to said position signal, said memory coupled to said image sensor and to said orientation sensor; and an image processing unit coupled to said memory for executing program instructions stored in said memory;

[wherein (a) said image processing unit processes an i-by-j array of said captured image data and said image sensor generates an i+1-by-j+1 array of said image data, or (b) an image capture unit generates an additional row and column of pixels for said captured image data from said image sensor]; *and*

*an image capture unit generates an additional row and column of pixels for said captured image data from said image sensor.*

2. The apparatus of claim 1, wherein the memory further comprises:

an image processing unit comprising program instructions for transforming one from a group consisting of captured image data and portrait image data, into processed image data.

3. The apparatus of claim 1, wherein: the signal is a portrait_left signal if the image sensor is rotated clockwise from a landscape orientation relative to the object, and the signal is a portrait_right signal if the image sensor is rotated counter-clockwise from the landscape orientation relative to the object; and the auto-rotate unit comprises program instructions for transforming the captured image data into portrait_left image data in response to the portrait_left signal and into portrait_right image data in response to the portrait_right signal.

4. The apparatus of claim 1, wherein:

the signal is a landscape signal if the image sensor is positioned in a level orientation relative to the object; and the auto-rotate unit comprises program instructions for transforming the captured image data into landscape image data in response to the landscape signal.

5. The apparatus of claim 3, wherein:

the image sensor has a top, a bottom, a right side and a left side;

the auto-rotate unit program instructions transform the captured image data into the portrait_left image data by transferring a prior portrait_left line of image data which starts further toward the bottom of the image sensor and ends further toward the top of the image sensor, then transferring a subsequent portrait_left line of image data, located closer to the right side of the image sensor than the prior portrait_left line of image data, and also starting further toward the bottom of the image sensor and ending further toward the top of the image sensor; and the auto-rotate unit program instructions transform the captured image data into the portrait_right image data by transferring a prior portrait_right line of image data which starts further toward the top of the image sensor and ends further toward the bottom of the image sensor, then transferring a subsequent portrait_right line of image data, located closer to the left side of the image sensor than the prior portrait_right line of image data, and also starting further toward the top of the image sensor and ending further toward the bottom of the image sensor.

6. The apparatus of claim 4, wherein:

the image sensor has a top, a bottom, a right side and a left side; and the auto-rotate unit program instructions transform the captured image data into the landscape image data by transferring a prior landscape line of image data which starts further toward the left side of the image sensor and ends further toward the right side of the image sensor, then transferring a subsequent landscape line of image data, located closer to the bottom of the image sensor than the prior landscape line of image data, and also starting further toward the left side of the image sensor and ending further toward the right side of the image sensor.

7. The apparatus of claim 3, wherein:

the portrait_left signal is generated by the orientation sensor if the image sensor is rotated approximately 45° clockwise from the level orientation, and the portrait_right signal is generated by the orientation sensor if the imaging subsystem is rotated approximately 45° counter-clockwise from the level orientation.

8. The apparatus of claim 5, wherein:

the prior portrait_left line of image data and the prior portrait_right line of image data comprise a "green, red, green, red" pixel pattern; and the subsequent portrait_left line of image data and the subsequent portrait_right line of image data comprise a "blue, green, blue, green" pixel pattern.

9. An apparatus for rotating a display orientation of multicolor captured image data having an i-by-j pixel matrix with a pattern representative of an object, comprising:

an image sensor, for generating the multicolor captured image data;

an input device, for generating a portrait_left signal in response to a first user selection, a portrait_right signal in response to a second user selection, and a landscape signal in response to a third user selection;

a memory, having:

an auto-rotate unit comprising program instructions for selectively transforming the multicolor captured image data into portrait_left image data in response to the portrait_left signal, portrait_right image data in response to the protrait_right signal, and landscape image data in response to the landscape signal; and an image processing unit comprising program instructions for transforming the portrait_left image data, the portrait_right image data and the landscape image data into processed image data; and a processing unit, coupled to the image sensor, to the input device, and to the memory, for executing program instructions stored in the memory;

wherein said image processing unit changes the number of pixel rows and pixel columns of the multicolor captured image data such that, from a defined referenced viewpoint, the portrait left image data, the portrait right image data, and the landscape image data, each includes the an (i−1)-by-(j−1) pixel matrix having said pattern.

10. The apparatus of claim 9, wherein the image processing unit has a first line length for processing the portrait_left image data and the portrait_right image data and a second line length for processing the landscape image data.

11. A method for rotating a display orientation of image data representative of an object, comprising the steps of:

generating image data with an image sensor;

identifying an orientation of the image sensor relative to the object at a time substantially simultaneous with the generating step, where said identifying is performed by an orientation sensor; and selectively transferring data to an image processing unit in response to the identifying step;

[wherein said image processing unit rotates said display orientation of said image data and (a) said image processing unit processes an i-by-j array of said captured image data and said image sensor generates an i+1-by-j+1 array of said image data, or (b) an image capture unit generates an additional row and column of pixels for said captured image data from said image sensor]

*wherein said image processing unit rotates said orientation of said image data by generating an additional row and column of pixels for said captured image data from said image sensor.*

[12. The method of claim 11, further comprising the step of:

generating an additional row and column of image data.]

13. The method of claim 11, further comprising the step of correcting defects within the image data caused by defects within the image sensor.

14. The method of claim 11, wherein the image sensor comprises a top, a right side and a left side, wherein the image comprises a "top portion," and wherein the step of identifying an orientation further comprises the steps of:

identifying a portrait_left orientation, if the left side of the image sensor corresponds to the "top portion" of the object;

identifying a portrait_right orientation, if the right side of the image sensor corresponds to the "top portion" of the object; and identifying a landscape orientation, if the top of the image sensor corresponds to the "top portion" of the object.

15. The method of claim 11, wherein the step of identifying an orientation further comprises the steps of:

identifying a portrait_left orientation, in response to a user selection of the portrait_left orientation on an input device;

identifying a portrait_right orientation, in response to a user selection of the protrait_right orientation on the input device; and identifying a landscape orientation, in response to a user selection of the landscape orientation on the input device.

16. The method of claim 11, wherein the orientation is a portrait_left orientation, wherein the image data is comprised of an array of pixel colors ordered in rows and columns, and wherein the step of selectively transferring comprises the steps of:

initializing a column variable to a first column of pixel colors required by the image processing unit;

initializing a row variable to a row containing a first pixel color required by the image processing unit;

transferring pixel color at an array location defined by the row variable and the column variable to and the image processing unit;

decrementing the row variable to a row containing a next pixel color required by the image processing unit;

returning to the transferring step, if a row containing a last pixel color has not been transferred;

incrementing the column variable to a next column of pixel colors required by the image processing unit; and returning to the initializing a row variable step, if a last column of pixel colors has not been transferred.

17. The method of claim 16, wherein the image data is replaced by defective image sensor information, further comprising the step of repeating the steps of claim 16.

18. The method of claim 16, further comprises the steps of:

configuring the image processing unit to accept an image data line length corresponding to the portrait_left orientation; and performing image processing on a line of transferred image data.

19. The method of claim 11, wherein the orientation is a portrait_right orientation, wherein the image data is comprised of an array of pixel colors ordered in rows and columns, and wherein the step of selectively transferring comprises the steps of:

initializing a column variable to a first column of pixel colors required by the image processing unit;

initializing a row variable to a row containing a first pixel color required by the image processing unit;

transferring pixel color at an array location defined by the row variable and the column variable, to the image processing unit;

incrementing the row variable to a row containing a next pixel color required by the image processing unit;

returning to the transferring step, if a row containing a last pixel color has not been transferred;

decrementing the column variable to a next column of pixel colors required by the image processing unit; and returning to the initializing a row variable step, if a last column of pixel colors has not been transferred.

20. The method of claim 11, wherein the orientation is a landscape orientation, wherein the image data is comprised of an array of pixel colors ordered in rows and columns, and wherein the step of selectively transferring further comprises the steps of:

initializing a row variable to a first row of pixel colors required by the image processing unit;

initializing a column variable to a column containing a first pixel color required by the image processing unit;

transferring pixel color at an array location defined by the row variable and the column variable, to the image processing unit;

incrementing the column variable to a column containing a next pixel color required by the image processing unit;

returning to the transferring step, if a column containing a last color pixel has not been transferred;

incrementing the row variable to a next row of pixel colors required by the image processing unit; and returning to the initializing a column variable step, if a last row of pixel colors has not been transferred.

21. An apparatus for rotating a display orientation of multicolor image data having an i-by-j pixel matrix with a pattern representative of an object, comprising:

means for generating multicolor image data with an image sensor, *the image data having a Bayer pattern*;

orientation sensor means for identifying an orientation of said image sensor relative to said object at a time substantially simultaneous with said generating said multicolor image data; and means for selectively transferring said multicolor image data to an image processing unit in response to said means for identifying;

wherein said image processing unit rotates said display orientation of said multicolor image data for providing rotated multicolor image data, and changes the number of pixel rows and pixel columns of said multicolor image data such that, from a defined referenced viewpoint, said rotated multicolor image data includes an (i−1)-by-(j−1) pixel matrix having said pattern.

22. The apparatus of claim 21, further comprising means for generating an additional row and column of image data.

23. The apparatus of claim 21, further comprising means for correcting defects within the image data caused by defects within the image sensor.

24. The apparatus of claim 21, wherein the image sensor comprises a top, a right side and a left side, wherein the image comprises a "top portion," and wherein the means for identifying an orientation further comprises:

means for identifying a portrait_left orientation, if the left side of the image sensor corresponds to the "top portion" of the object;

means for identifying a portrait_right orientation, if the right side of the image sensor corresponds to the "to portion" of the object; and means for identifying a landscape orientation, if the top of the image sensor corresponds to the "top portion" of the object.

25. The apparatus of claim 21, wherein the orientation is a portrait_left orientation, wherein the image data is comprised of an array of pixel colors ordered in rows and columns, and wherein the means for selectively transferring comprises:

means for initializing a column variable to a first column of pixel colors required by the image processing unit;

means for initializing a row variable to a row containing a first pixel color required by the image processing unit;

means for transferring pixel color at an array location, defined by the row variable and the column variable, to the image processing unit;

means for decrementing the row variable to a row containing a next pixel color required by the image processing unit;

means for returning to the means for transferring, if a row containing a last pixel color has not been transferred;

means for incrementing the column variable to a next column of pixel colors required by the image processing unit; and means for returning the means for initializing a row variable, if a last column of pixel colors has not been transferred.

26. The apparatus of claim 21, wherein the orientation is a portrait_right orientation, wherein the image data is comprised of an array of pixel colors ordered in rows and columns, and wherein the means for selectively transferring comprises:

means for initializing a column variable to a first column of pixel colors required by the image processing unit;

means for initializing a row variable to a row containing a first pixel color required by the image processing unit;

means for transferring pixel color at an array location, defined by the row variable and the column variable, to the image processing unit;

means for incrementing the row variable to a row containing a next pixel color required by the image processing unit;

means for returning to the means for transferring, if a row containing a last pixel color has not been transferred;

means for decrementing the column variable to a next column of pixel colors required by the image processing unit; and means for returning to the means for initializing a row variable, if a last column of pixel colors has not been transferred.

27. The apparatus of claim 21, wherein the orientation is a landscape orientation, wherein the image data is comprised of an array of pixel colors ordered in rows and columns, and wherein the means for selectively transferring comprises:

means for initializing a row variable to a first row of pixel colors required by the image processing unit;

means for initializing a column variable to a column containing a first pixel color required by the image processing unit;

means for transferring pixel color at an array location, defined by the row variable and the column variable, to the image processing unit;

means for incrementing the column variable to a column containing a next pixel color required by the image processing unit;

means for returning to the means for transferring, if a column containing a last color pixel has not been transferred;

means for incrementing the row variable to a next row of pixel colors required by the image processing unit; and means for returning to the means for initializing a column variable, if a last row of pixel colors has not been transferred.

28. A computer useable medium embodying computer readable program code for causing a computer to rotate a display orientation of multicolor image data having an i-by-j pixel matrix with a pattern representative of an object, by performing steps comprising:

generating said multicolor image data with an image sensor, *the image data having a Bayer pattern*;

identifying an orientation of the image sensor relative to the object at a time substantially simultaneous with the generating step, wherein said identifying of said orientation is performed with an orientation sensor; and selectively transferring image data to an image processing unit in response to the identifying step, wherein said image processing unit rotates said display orientation of said multicolor image data for providing rotated multicolor image data, and changes the number of pixel rows and pixel columns of said multicolor image data such that, from a defined referenced viewpoint, said rotated multicolor image data includes having an (i−1)-by-(j−1) pixel matrix having said pattern.

29. The computer useable medium of claim 28, further comprising program code for generating an additional row and column of image data.

30. The computer useable medium of claim 28, further comprising program code for correcting defects within the image data caused by defects within the image sensor.

31. The computer useable medium of claim 28, wherein the image sensor comprises a top, a right side and a left side, wherein the image comprises a "top portion," and wherein the program code for performing the step of identifying an orientation further comprises program code for:

identifying a portrait_left orientation, if the left side of the image sensor corresponds to the "top portion" of the object;

identifying a portrait_right orientation, if the right side of the image sensor corresponds to the "top portion" of the object; and identifying a landscape orientation, if the top of the image sensor corresponds to the "top portion" of the object.

32. The computer useable medium of claim 28, wherein the orientation is a portrait_left orientation, wherein the image data is comprised of an array of pixel colors ordered in rows and columns, and wherein the program code for performing the step of selectively transferring comprises program code for:

initializing a column variable to a first column of pixel colors required by the image processing unit;

initializing a row variable to a row containing a first pixel color required by the image processing unit;

transferring pixel color at an array location, defined by the row variable and the column variable, to the image processing unit;

decrementing the row variable to a row containing a next pixel color required by the image processing unit;

returning to the transferring step, if a row containing a last pixel color has not been transferred;

incrementing the column variable to a next column of pixel colors required by the image processing unit; and returning to the initializing a row variable step, if a last column of pixel colors has not been transferred.

33. The computer useable medium of claim 28, wherein the orientation is a protrait_right orientation, wherein the image data is comprised of an array of pixel colors ordered in rows and columns, and wherein the program code for performing the step of selectively transferring comprises program code for:

initializing a column variable to a first column of pixel colors required by the image processing unit;

initializing a row variable to a row containing a first pixel color required by the image processing unit;

transferring pixel color at an array location, defined by the row variable and the column variable, to the image processing unit;

incrementing the row variable to a row containing a next pixel color required by the image processing unit;

returning to the transferring step, if a row containing a last pixel color has not been transferred;

decrementing the column variable to a next column of pixel colors required by the image processing unit; and returning to the initializing a row variable step, if a last column of pixel colors has not been transferred.

34. The computer useable medium of claim 28, wherein the orientation is a landscape orientation, wherein the image data is comprised of an array of pixel colors ordered in rows and columns, and wherein the program code for performing the step of selectively transferring comprises program code for:

initializing a row variable to a first row of pixel colors required by the image processing unit;

initializing a column variable to a column containing a first pixel color required by the image processing unit;

transferring pixel color at an array location, defined by the row variable and the column variable, to the image processing unit;

incrementing the column variable to a column containing a next pixel color required by the image processing unit;

returning to the transferring step, if a column containing a last color pixel has not been transferred;

incrementing the row variable to a next row of pixel colors required by the image processing unit; and returning to the initializing a column variable step, if a last row of pixel colors has not been transferred.

35. An apparatus for rotating a display orientation of multicolor captured image data having an i-by-j pixel matrix with a pattern representative of an object, comprising:

an image sensor, for generating said multicolor captured image data, *the image data having a Bayer pattern*;

an orientation sensor coupled to said image sensor, for generating a signal corresponding to the position of said image sensor relative to said object; and a hardware device, having an auto-rotate unit comprising circuits for selectively transforming said multicolor captured image data into rotated multicolor image data in response to said position signal, said hardware device coupled to said image sensor and to said orientation sensor;

wherein, from a defined referenced viewpoint, said rotated multicolor image data includes an (i−1)-by-(j−1) pixel matrix having said pattern.

*36. An apparatus for rotating a display orientation of captured image data representative of an object, the apparatus comprising:*

*an image sensor, for generating said captured image data;*

*an input device, for generating an orientation signal in response to a user selection;*

*a memory, having an auto-rotate unit for selectively transforming said captured image data into rotated image data in response to said orientation signal from said input device; and*

*an image processing unit coupled to said memory for processing the image data by generating at least one additional row and column of pixels for said captured image data from said image sensor.*

*37. A digital image capture device, comprising:*

*an image sensor, for capturing image data;*

*an orientation sensor, for generating an orientation signal indicating whether the image sensor is in a portrait or landscape position; and*

*an auto-rotate unit coupled to the image sensor and the orientation sensor, for automatically rotating a subset of the image data in response to the orientation signal.*

*38. The digital image capture device of claim 37, further comprising:*

*an image capture unit coupled to the image sensor, for adding m additional rows and n additional columns to an i-by-j array of image data to form an i+m-by-j+n array of image data to be rotated by the auto-rotate unit in response to the orientation signal.*

*39. A method of rotating image data in a digital image capture device, comprising:*

*capturing image data from an image sensor;*

*providing an orientation signal indicating whether the image sensor is in a portrait or landscape position; and*

*automatically rotating a subset of the captured image data in response to the orientation signal.*

*40. The method of claim 39, further comprising:*

*adding m additional rows and n additional columns to an i-by-j array of the image data to form an i+m-by-j+n array of image data.*

*41. A computer-readable medium having stored thereon instructions which, when executed by a processor, cause the processor to perform the steps of:*

*capturing image data from an image sensor;*

*providing an orientation signal indicating whether the image sensor is in a portrait or landscape orientation; and*

*automatically rotating a subset of the captured image data in response to the orientation signal.*

*42. The computer-readable medium of claim 41, further comprising:*

*adding m additional rows and n additional columns to an i-by-j array of the image data to form an i+m-by-j+n array of image data.*

*43. A digital image capture device, comprising:*

*image sensor means for generating image data;*

*means for generating an orientation signal indicating either a portrait orientation or a landscape orientation of the image sensor; and*

*means for automatically rotating a subset of the image data in response to the orientation signal.*

*44. A digital image capture device, comprising:*

*an image sensor, for generating said captured image data including a plurality of rows and columns of pixels;*

*an orientation sensor coupled to said image sensor, for generating a position signal indicating whether the image sensor is in a portrait or landscape position;*

*a memory, having an auto-rotate unit comprising program instructions for selectively transforming said captured image data into rotated image data in response to said position signal by processing at least one row of pixels and at least one column of pixels less than the plurality of rows and columns of pixels in the captured image data, said memory coupled to said image sensor and to said orientation sensor; and*

*an image processing unit coupled to said memory for executing the stored program instructions to rotate said capture image data.*

*45. A method for rotating a display orientation of image data, comprising:*

*generating image data with an image sensor including a plurality of rows and columns of pixels;*

*determining with an orientation sensor a portrait orientation or a landscape orientation for the image data substantially simultaneously with generating the image data; and*

*processing the image data with an image processing unit in response to the orientation signal to rotate the image data, by rotating less than all of the plurality of rows and columns of pixels of the image data.*

* * * * *

UNITED STATES PATENT AND TRADEMARK OFFICE

CERTIFICATE OF CORRECTION

PATENT NO. : RE 38,896 E
DATED : November 29, 2005
INVENTOR(S) : Eric C. Anderson It is certified that error appears in the above-identified patent and that said Letters Patent is hereby corrected as shown below:

Column 16,
Line 4, delete “the” after “includes”.

Column 17,
Line 4, delete “and” after “variable to”.
Line 49, delete “further” after “selectively transferring”.

Column 18,
Line 34, change “to portion” to -- top portion --.
Line 58, add -- to -- after “returning”.

Column 19,
Line 60, delete “having” after “includes”.

Signed and Sealed this

Thirtieth Day of May, 2006

JON W. DUDAS
*Director of the United States Patent and Trademark Office*

UNITED STATES PATENT AND TRADEMARK OFFICE

CERTIFICATE OF CORRECTION

PATENT NO. : RE 38,896 E
APPLICATION NO. : 10/040249
DATED : November 29, 2005
INVENTOR(S) : Eric C. Anderson It is certified that error appears in the above-identified patent and that said Letters Patent is hereby corrected as shown below:

Col. 1, Line 5 before the 1st para. insert

-- Notice: More than one reissue application has been filed for the reissue of Patent No. 6,011,585. This reissue has a continuation application based upon it. The continuation application is 11/206,279. --.

Signed and Sealed this

Thirteenth Day of October, 2009

David J. Kappos

David J. Kappos
*Director of the United States Patent and Trademark Office*